(12) United States Patent
Kubota et al.

(10) Patent No.: US 11,170,666 B2
(45) Date of Patent: Nov. 9, 2021

(54) DENTAL TREATMENT TRAINING APPARATUS AND DENTAL TREATMENT TRAINING SYSTEM

(71) Applicant: J.MORITA CORPORATION, Osaka (JP)

(72) Inventors: Tsutomu Kubota, Kyoto (JP); Gaku Yoshimoto, Kyoto (JP); Toshitaka Sekioka, Osaka (JP); Tomohisa Takagi, Osaka (JP)

(73) Assignee: J.MORITA CORPORATION, Osaka (JP)

( * ) Notice: Subject to any disclaimer, the term of this patent is extended or adjusted under 35 U.S.C. 154(b) by 249 days.

(21) Appl. No.: 16/569,526

(22) Filed: Sep. 12, 2019

(65) Prior Publication Data
US 2020/0005676 A1     Jan. 2, 2020

Related U.S. Application Data

(63) Continuation of application No. PCT/JP2018/009697, filed on Mar. 13, 2018.

(30) Foreign Application Priority Data

Mar. 15, 2017  (JP) .............................. JP2017-050569

(51) Int. Cl.
| | |
|---|---|
| *G06T 19/00* | (2011.01) |
| *G09B 23/28* | (2006.01) |
| *A61C 3/02* | (2006.01) |
| *G06F 3/0482* | (2013.01) |

(Continued)

(52) U.S. Cl.
CPC .............. *G09B 23/283* (2013.01); *A61C 3/02* (2013.01); *G06F 3/0482* (2013.01);
(Continued)

(58) Field of Classification Search
None
See application file for complete search history.

(56) References Cited

U.S. PATENT DOCUMENTS

| | | |
|---|---|---|
| 2007/0184422 A1 | 8/2007 | Takahashi |
| 2016/0249989 A1 | 9/2016 | Devam et al. |
| 2016/0314710 A1 | 10/2016 | Jarc et al. |

FOREIGN PATENT DOCUMENTS

| | | |
|---|---|---|
| EP | 1739642 A1 | 1/2007 |
| JP | 2001-51593 A | 2/2001 |

(Continued)

OTHER PUBLICATIONS

Haddawy et al., "Augmented Reality Haptics System for Dental Surgical Skills Training", ACM, 2010. (Year: 2010).*

(Continued)

*Primary Examiner* — Nicholas R Wilson
(74) *Attorney, Agent, or Firm* — Nakanishi IP Associates, LLC

(57) ABSTRACT

A dental treatment training apparatus allows practice of complex treatments involving high accuracy and skill levels. A dental treatment training apparatus for providing a simulated treatment in which a treatment instrument is applied onto a tooth model includes a display unit that displays, in a superimposed manner, 3D image information based on predefined 3D information about the tooth model and the treatment instrument on a 3D view image, a position detector that detects 3D positional information about the tooth model, the treatment instrument, and the display unit, and a control unit that causes the display unit to display, in a superimposed manner, 3D image information corresponding to an item selected on a superimposed selection operation display for allowing selection of an item associated with the (Continued)

simulated treatment based on the 3D positional information detected by the position detector.

5 Claims, 23 Drawing Sheets

(51) Int. Cl.
*G09B 9/00* (2006.01)
*G09B 19/24* (2006.01)

(52) U.S. Cl.
CPC .............. *G06T 19/006* (2013.01); *G09B 9/00* (2013.01); *G09B 19/24* (2013.01); *G06T 2200/24* (2013.01); *G06T 2210/41* (2013.01)

(56) References Cited

FOREIGN PATENT DOCUMENTS

| | | |
|---|---|---|
| JP | 2015-125421 A | 7/2015 |
| WO | 2008/023464 A1 | 2/2008 |

OTHER PUBLICATIONS

Soler et al., "Patient-specific Surgical Simulation", IRCAD, 2008. (Year: 2008).*
Extended European Search Report issued in European Patent Application No. 18768075.6, dated Nov. 6, 2020 (8 pages).
Office Action issued in Korean Patent Application No. 10-2019-7024784 dated Oct. 12, 2020 (13 pages).
Office Action issued in Japanese Patent Application No. 2017-050569 dated Oct. 29, 2019 (6 pages).
Communication pursuant to Rule 159(1)(a) EPC and Rule 49.5 PCT or Rule 74.1 (a) PCT issued in European Patent Application No. 18768075.6, dated Oct. 21, 2019 (2 pages).
Office Action issued in Chinese Patent Application No. 201880015814.9 dated Nov. 18, 2020, with English Translation (14 pages).
International Search Report issued in PCT/JP2018/009697 dated Jun. 5, 2018 with English Translation (4 pages).

* cited by examiner

DENTAL TREATMENT TRAINING APPARATUS AND DENTAL TREATMENT TRAINING SYSTEM

CROSS-REFERENCE TO RELATED APPLICATIONS

This application is a continuation application of International Patent Application No. PCT/JP2018/009697 filed on Mar. 13, 2018, which claims priority to Japanese Patent Application No. 2017-050569 filed on Mar. 15, 2017, the entire contents of which are incorporated by reference.

BACKGROUND OF INVENTION

Field of the Invention

The present invention relates to a dental treatment training apparatus and a dental treatment training system for use in teaching and practicing dental treatments.

Background Art

Various training apparatuses simulating human bodies have been developed and used in teaching medical procedures including dental treatments. For example, Patent Literature 1 describes a medical training apparatus incorporating a drive, and simulating the situation of a patient receiving a treatment by placing a manikin simulating a patient body on a dental examination table and controlling the drive with a controller. The apparatus may be used in, for example, basic training conducted before clinical training using a human body.

However, treatments in reality increase complexity and often involve high accuracy and skill levels. Dental implant treatment is one such procedure that involves high accuracy and skill levels. In this procedure, an implant called a fixture is embedded into a jawbone, and an abutment, a screw, and a crown (implant denture) are attached to the embedded implant. In this treatment, a hole drilled in a jawbone is an invisible portion inside a tooth, and an implant is placed in position using a technique such as X-ray computed tomography (CT) imaging or preoperational simulation software in implant treatment in reality.

Despite the need for repeated practice in such complex treatments involving high accuracy and skill levels, medical training apparatuses or methods are unavailable for practicing these highly accurate and skillful treatments.

CITATION LIST

Patent Literature

Patent Literature 1: WO2008/023464

SUMMARY OF INVENTION

One or more aspects of the present invention are directed to a dental treatment training apparatus and a dental treatment training system that allow practice of complex treatments involving high accuracy and skill levels.

A dental treatment training apparatus according to one aspect of the present invention is an apparatus for providing a simulated treatment in which a treatment instrument is applied onto a dental model. The apparatus includes a display unit that displays, in a superimposed manner in a field of view of a trainee, image information based on predefined three-dimensional (3D) information about the dental model and the treatment instrument, a 3D position detector that detects 3D positional information about the dental model, the treatment instrument, and the display unit, a selection unit that receives selection of an item associated with the simulated treatment, and a display control unit that causes the display unit to display, in a superimposed manner, image information about at least an invisible portion of the dental model and the treatment instrument corresponding to the item selected with the selection unit based on the 3D positional information detected by the 3D position detector.

The treatment instrument may include a handpiece receiving a cutting tool such as a file, a reamer, or a drill burr, an air turbine handpiece, a laser handpiece for emitting a laser beam, a scaler handpiece, an oral cavity camera, a 3D oral cavity scanner, a light curing unit, and any other instrument used for dental treatments. The treatment instrument may also include a cutting tool alone, such as a file, a reamer, or a drill burr. Thus, applying the treatment instrument refers to, for example, performing any procedure, such as cutting or scaling, on the dental model using the treatment instrument.

The simulated treatment refers to a treatment for practice in which a procedure performed on teeth using a treatment instrument is performed on the dental model.

The predefined 3D information about the dental model and the treatment instrument is 3D information about their shapes and structures. In particular, the predefined 3D information about teeth and jawbones or the dental model may be 3D information obtained through X-ray CT imaging of the teeth and the jawbones or 3D information obtained through simulation of real X-ray CT imaging.

The display unit that displays image information in a superimposed manner in the field of view of the trainee may include a goggle- or eyeglass-shaped display unit, such as a head mount display (HMD) and a head-up display (HUD). When such a display unit displays image information in a superimposed manner, the trainee can perceive virtual reality (VR), augmented reality (AR), or mixed reality (MR).

The field of view of the trainee may include, in addition to the field of view visually observed through the goggle- or eyeglass-shaped display unit, a field of view corresponding to an image appearing on the display unit captured with cameras included in the display unit. The image corresponding to the field of view may be magnified or reduced on the display unit as appropriate depending on, for example, the practice to be performed.

The 3D position detector may detect the 3D positions of the dental model, the treatment instrument, and the display unit by detecting, from above with infrared cameras, infrared markers attached to the dental model, the treatment instrument, and the display unit. An image recognition camera may detect, from above, the 3D positions of the dental model, the treatment instrument, and the display unit by image recognition, such as pattern recognition.

The 3D positional information detected for the dental model, the treatment instrument, and the display unit may include their absolute 3D positions, 3D positions relative to one another, or a combination of the absolute 3D positions and the relative 3D positions. All relative 3D positional relationships between the dental model, the treatment instrument, and the display unit are directly or indirectly detected from the 3D positional information.

The invisible portion refers to an area inside a tooth model or a jaw model that is visually unrecognizable before procedures. The invisible portion of the treatment instrument refers to a portion that does not appear in the field of view while the treatment instrument is placed in the oral cavity. The invisible portion may also include, in addition to a hidden portion, a portion inside a model, and may further include a site that cannot be directly observed visually, such as a missing part or a part to be filled by a prosthesis. Thus, the image information about at least the invisible portion may include, in addition to the image information about the invisible portion, image information about all or part of the dental model or the treatment instrument including the invisible portion.

The item refers to information associated with the simulated treatment, and may include patient information for each patient, patient profile information, diagnosis information used for diagnosis, such as X-ray CT imaging information, treatment to be provided, information about the type and the control of the treatment instrument, and information about the type and the shape of the cutting tool. The information associated with the selected item refers to, in addition to information directly associated with the selected item, information generated in association with the selected item, that is, information indirectly associated with the selected item.

The selection unit may receive selection of an item from the items superimposed on the display unit or from the items appearing on, for example, a separately prepared display by recognizing a gesture operation performed by the trainee or receive such selection with a separately prepared physical selection operation unit operable with a voice, a gaze, or a direct operation.

The apparatus according to the above aspect of the present invention allows the trainee to practice complex treatments involving high accuracy and skill levels.

More specifically, the dental treatment training apparatus includes the display unit that displays, in a superimposed manner in the field of view of the trainee, image information based on predefined 3D information about the dental model and the treatment instrument, the 3D position detector that detects 3D positional information about the dental model, the treatment instrument, and the display unit, and the display control unit that causes the display unit to display, in a superimposed manner, image information about at least the invisible portion of the dental model and the treatment instrument corresponding to the item selected with the selection unit based on the 3D positional information detected by the 3D position detector. The dental treatment training apparatus detects all relative 3D positional relationships between the dental model, the treatment instrument, and the display unit, and thus appropriately superimposes the image representing the invisible portion in the field of view of the trainee. Thus, the dental treatment training apparatus provides the situation of the invisible portion being observed visually in the simulated treatment, thus allowing the trainee to precisely practice complex treatments involving high accuracy and skill levels.

In another aspect of the present invention, the predefined 3D information about the dental model may include 3D information about the inside of the dental model.

The structure according to this aspect of the present invention allows the trainee to more precisely practice a complex treatment in the simulated treatment.

More specifically, the predefined 3D information about the dental model, which includes the 3D information about the inside of the dental model, can provide the situation of the treatment state inside the dental model being observed visually in the simulated treatment, thus allowing the trainee to more precisely practice a complex treatment in the simulated treatment.

In another aspect of the present invention, the selection unit may include a treatment selection unit that receives selection of a simulated treatment to be performed, and an instrument selection unit that receives selection of a treatment instrument to be used. The display control unit may display, in a superimposed manner, predefined 3D information about the dental model corresponding to the simulated treatment selected with the treatment selection unit and predefined 3D information about the treatment instrument selected with the instrument selection unit.

The simulated treatment to be performed refers to any dental treatment using a treatment instrument, including, for example, root canal treatment, implant treatment, gum disease treatment, tooth decay treatment, abutment tooth formation, scaling, flap surgery, and any other simulated dental procedure performed on the dental model. The simulated treatment may also include, in addition to the dental treatments, dental preventive procedures.

The selection operation performed with the instrument selection unit may include selecting multiple treatment instrument items appearing on a selection screen in a selectable manner. For an apparatus that recognizes a selected treatment instrument by recognizing the shape of the treatment instrument selected and held by the trainee, selection and holding of the treatment instrument may serve as a selection operation. In another example, picking a treatment instrument out of a holder holding treatment instruments may be detected as a selection operation. The instrument selection unit may also serve as a cutting instrument selection unit for receiving selection of a cutting instrument.

The structure according to the above aspect of the present invention allows selection of an intended treatment or a treatment associated with a preset symptom and selection of the treatment instrument for the selected treatment. The apparatus thus allows the trainee to more precisely practice a complex treatment while displaying, in a superimposed manner, the predefined 3D information about the dental model corresponding to the selected simulated treatment and the predefined 3D information about the selected treatment instrument.

In another aspect of the present invention, the selection unit may include a patient selection unit that receives selection of an item from a plurality of simulated patient information items each including preset information items about a patient, and a preset information selection unit that receives selection of a preset information item associated with the simulated treatment from the preset information items included in the simulated patient information item. The display control unit may display, in a superimposed manner, the preset information item selected with the preset information selection unit.

The structure according to the above aspect of the present invention allows selection and review of the preset information about the selected simulated patient and determination of the treatment allocated to the simulated patient based on the preset information, thus allowing the trainee to practice in a situation similar to a clinical situation.

In another aspect of the present invention, the display control unit may cause the display unit to display, in a superimposed manner, an application state of the treatment instrument onto the dental model during the simulated treatment.

The application state of the treatment instrument onto the dental model during the simulated treatment refers to, for example, a scaling state of a scaler handpiece to dental calculus within a periodontal pocket during practice of scaler treatment, a cutting state of a file or a reamer into a root canal during practice of root canal treatment, or a drilling state of a drill burr in a receiving hole during practice of implant treatment.

The structure according to the above aspect of the present invention provides the situation of the application state at a site less easily observable being observed visually in the simulated treatment, thus allowing the trainee to precisely practice a more complex treatment in the simulated treatment.

In another aspect of the present invention, the treatment instrument may be a cutting instrument to cut the dental model, and the display unit displays, in a superimposed manner, a state indication image indicating the application state of the treatment instrument to indicate a relative position of a tip of the cutting instrument relative to a preset cutting end point in the dental model to be cut with the cutting instrument.

The cutting instrument may be a treatment instrument receiving a cutting tool or a cutting tool alone.

The cutting end point refers to, for example, a position of the root apex set in root canal treatment or the bottom of the hole to be drilled in the jawbone for placing an implant in implant treatment.

The relative position of the tip of the cutting instrument relative to the cutting end point may be indicated as the distance to the end point in the depth direction and the deviation from or the inclination relative to the end point in the plane direction. The relative position may be represented in a numerical value or points, or may appear as a simulated image. The decrease in the distance, or the deviation or the inclination, may be represented by a change in length or diameter.

For an implant procedure, the position of the tip of the cutting instrument is plotted on a circular coordinate system with the cutting end point plotted at the center. On the right and left of the circular coordinate system, X-ray CT images of a tooth to undergo the implant procedure appear as cross-sectional images along X-axis and Y-axis each perpendicular to the central axis of the receiving hole. Each cross-sectional X-ray CT image includes a superimposed image of the cutting instrument representing its real-time position. Each cross-sectional X-ray CT image also includes an axis along which the cutting instrument is to be inserted, representing an ideal insertion direction. As the angle and the position of the actual cutting instrument align with or deviate from the insertion axis, a circular indication with a changing diameter appears on the circular coordinate system. Such indications guide the insertion and thus allow an accurate, safe, and efficient procedure to be performed. Below the circular coordinate system, a display unit may be provided to indicate the cutting depth reached by the cutting instrument.

For the practice of root canal treatment, the insertion state and the cutting state of the cutting instrument, such as a file or a reamer, into the root canal are preliminarily superimposed on the display unit. With such states being displayed, the root canal length measured with a root canal length measurement device may additionally appear on the superimposed cross-sectional image of the root canal based on the X-ray CT image.

The structure according to the above aspect of the present invention allows visual observation for accurately determining the relative position of the cutting instrument relative to the cutting end point at a site that cannot be observed visually, thus preventing, for example, a failure such as excessive cutting and allowing more precise practice in the simulated treatment.

A dental treatment training system according to still another aspect of the present invention includes the dental treatment training apparatus described above, and a manikin patient body including at least a head having an oral cavity in which the dental model is mounted in a replaceable manner.

The system according to the above aspect provides a more realistic treatment situation for practice than the training system including merely tooth models or jaw models on which tooth models are mounted. The replaceable dental model can be cut with a real treatment instrument, thus allowing repeated practice in a more realistic situation than, for example, a system merely providing virtual images for simulated treatments.

The dental treatment training apparatus and the dental treatment training system according to the above aspects of the present invention allow practice of complex treatments involving high accuracy and skill levels.

DETAILED DESCRIPTION

A dental treatment training system 1 according to embodiments of the present invention and simulated treatments for practice using the dental treatment training system 1 will now be described with reference to FIGS. 1 to 21.

Figure 1:
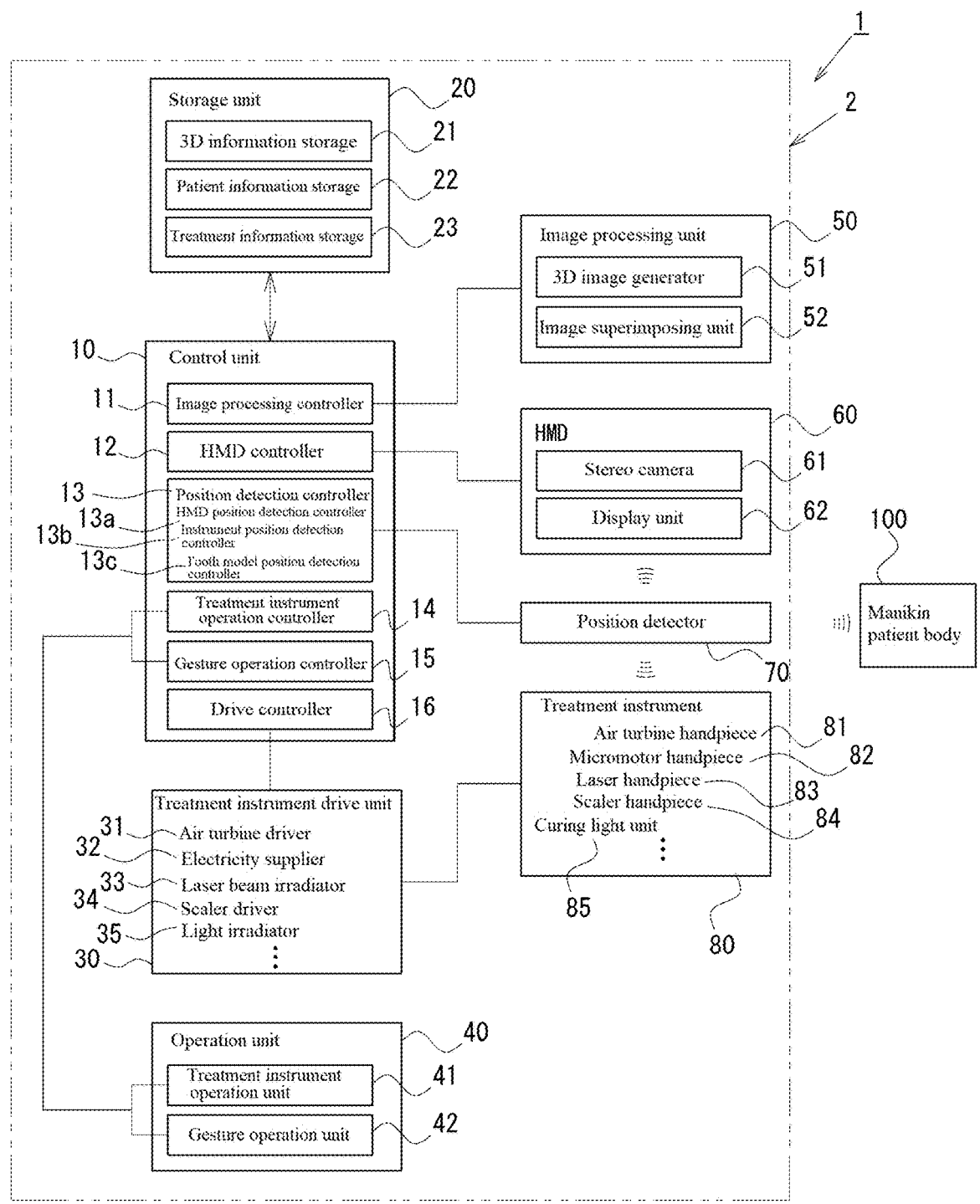
FIG. 1 is a block diagram of a dental treatment training apparatus.

The dental treatment training system 1 includes a dental treatment training apparatus 2 and a manikin patient body 100 as shown in FIG. 1. A trainee P wearing a head mount display (HMD) 60 included in the dental treatment training apparatus 2 practices a procedure on the manikin patient body 100 placed on a chair unit 200 using treatment instruments 80.

Figure 2:
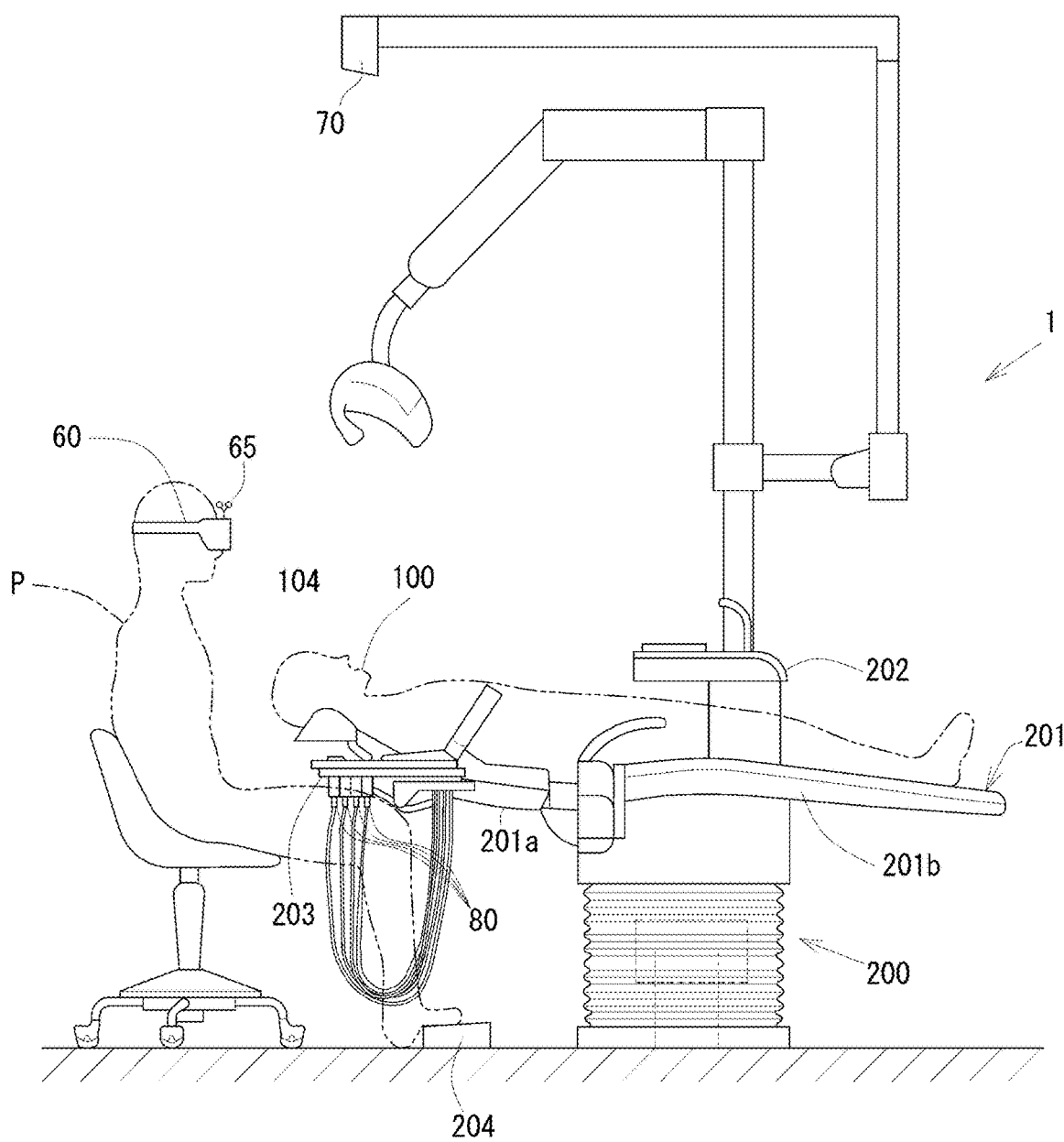
FIG. 2 is a schematic diagram describing a situation of a treatment for practice.
Figure 3:
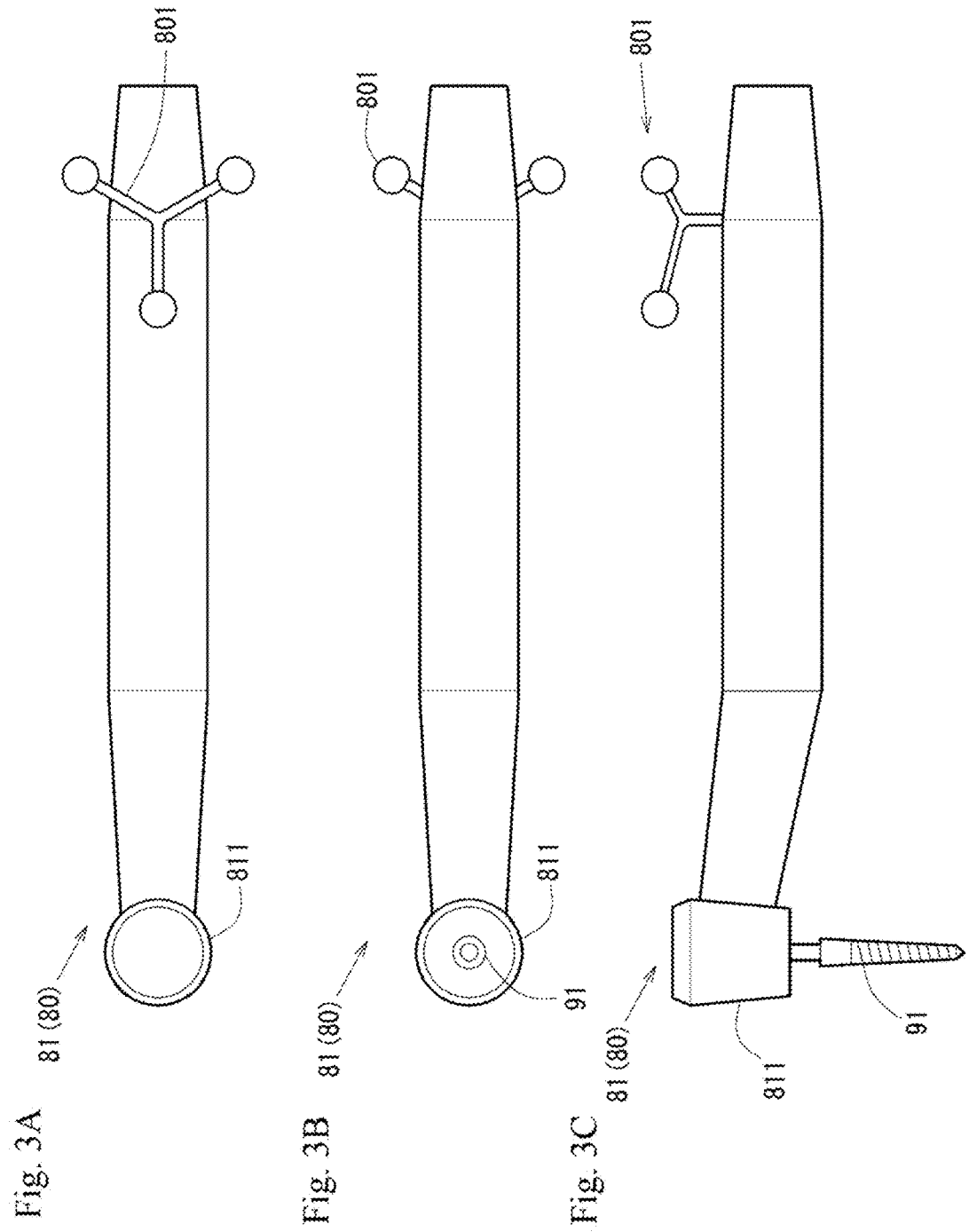
FIGS. 3A, 3B, and 3C are schematic diagrams of a micromotor handpiece.
Figure 6:
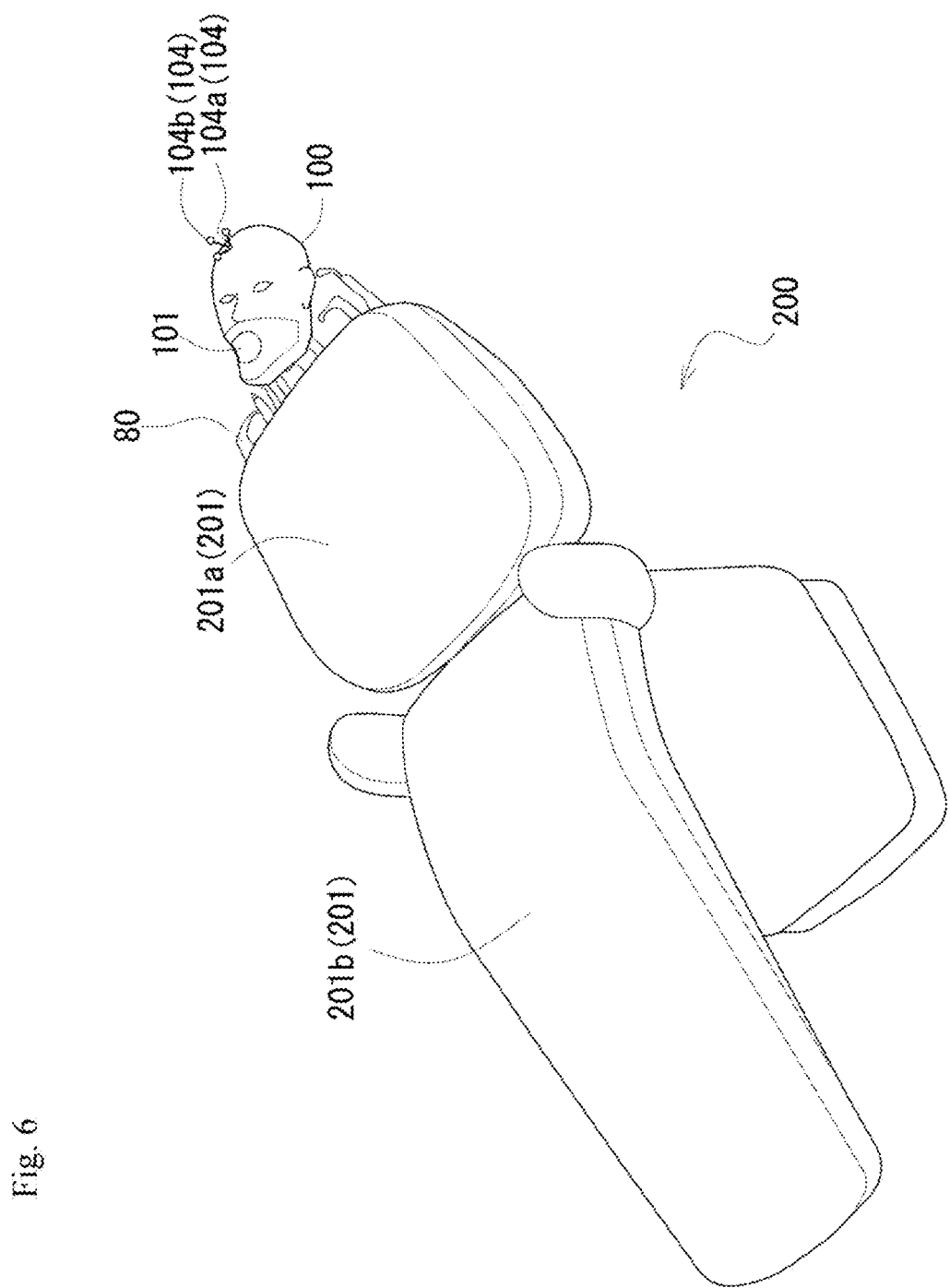
FIG. 6 is a schematic perspective view of a manikin patient body.

As shown in FIG. 2, the chair unit 200 receiving the manikin patient body 100 mainly includes a treatment chair 201 with a reclining backrest 201a and a liftable seat 201b, a basin unit 202 with a suction device for drawing saliva or cooling water and a device for rinsing the mouth, an operation unit 203, and a foot controller 204. The operation unit 203 includes a holder for receiving the treatment instruments 80. As shown in FIG. 6, the treatment instruments 80 may also be received in a shoulder part of the backrest 201a included in the treatment chair 201 in a pullable manner.

Figure 20:
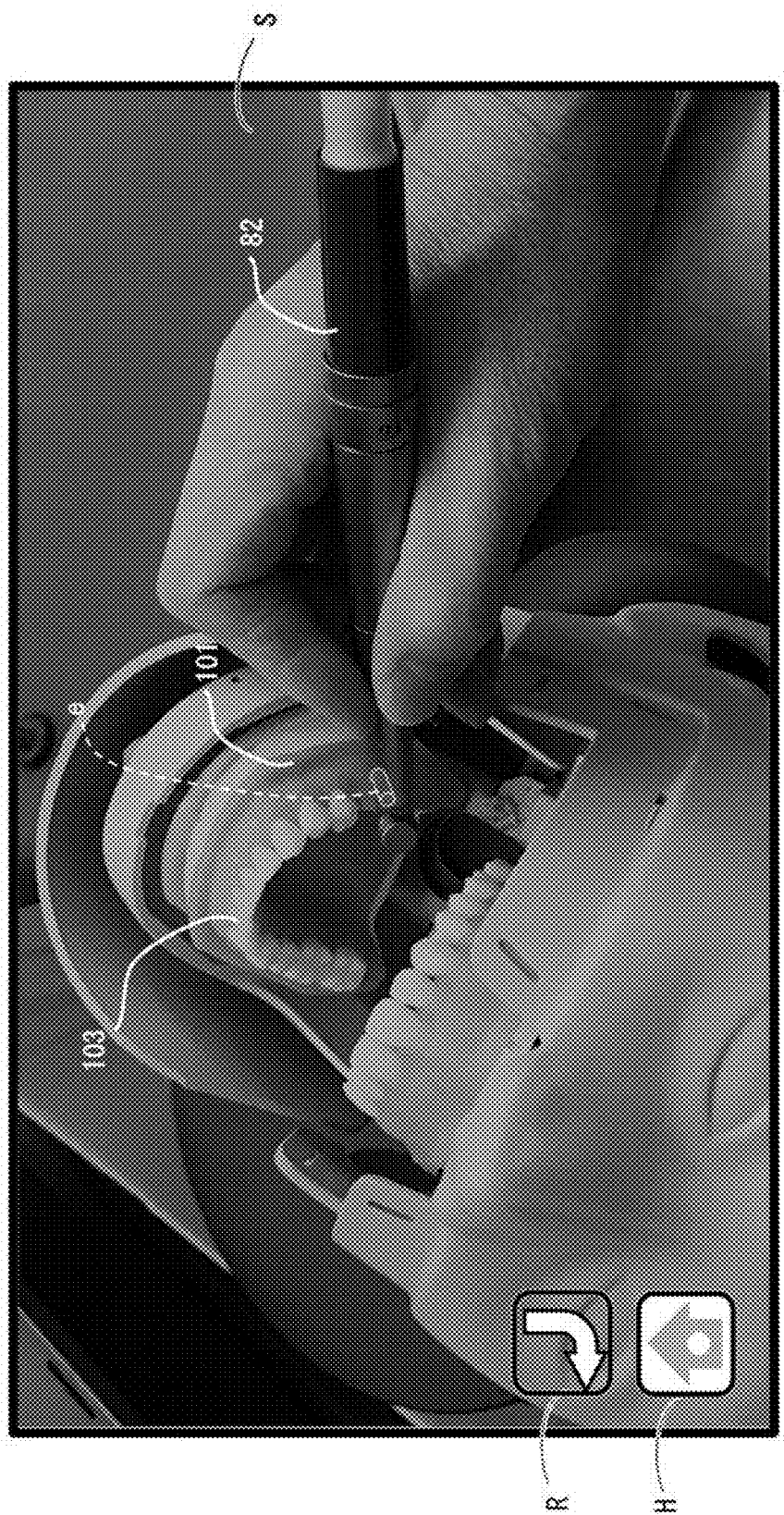
FIG. 20 is a schematic diagram describing a superimposed display during the practice of implant treatment using a handpiece for cutting.

The manikin patient body 100 is a head model placed on the chair unit 200. An oral cavity 101 (FIG. 6) in the manikin patient body 100 as a head model includes jaw models 102 on which tooth models 103 are mounted in a removable manner along dental arches (FIG. 20). Instead, the manikin patient body 100 may be a full body model as indicated with a broken line in FIG. 2.

As shown in FIG. 6, the manikin patient body 100 includes an infrared marker 104 that allows detection of the three-dimensional (3D) positions of the tooth models 103 in the manikin patient body 100. The infrared marker 104 includes a trifurcated support 104a and spherical markers 104b at the distal ends of the support 104a. The three spherical markers 104b are detected by a position detector 70 (FIG. 2) that includes infrared cameras to detect the 3D position of the manikin patient body 100.

Figure 16:
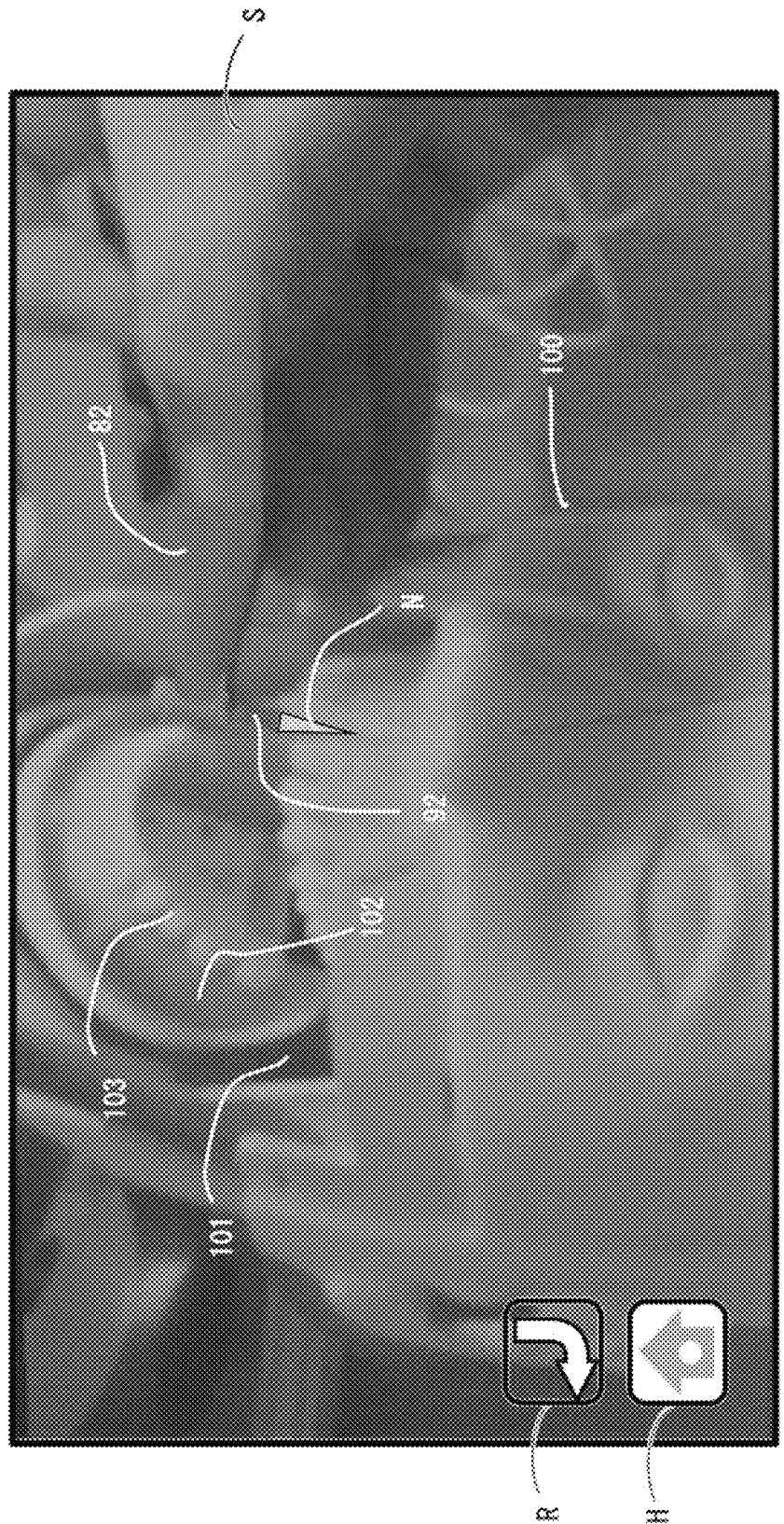
FIG. 16 is a schematic diagram describing a superimposed display during a practice using the handpiece for cutting.

As shown in FIG. 16, the tooth models 103 are mounted on the jaw models 102 at predetermined positions in the oral cavity 101 of the manikin patient body 100. The 3D positions of the tooth models 103 may be calculated based on the 3D positions detected by the position detector 70. The infrared marker 104 may be attached to the backrest 201a included in the treatment chair 201. The infrared marker 104 may include four or more spherical markers 104b, rather than three spherical markers 104b. The position detector 70 including the infrared cameras may be installed above the manikin patient body 100.

As shown in FIG. 1, the dental treatment training apparatus 2 included in the dental treatment training system 1 includes a control unit 10, a storage unit 20, a treatment instrument drive unit 30, an operation unit 40, an image processing unit 50, the HMD 60, the position detector 70, and the treatment instruments 80.

The control unit 10, which includes a central processing unit (CPU), a read-only memory (ROM), and a random access memory (RAM), has the functional components described below.

More specifically, the control unit 10 includes an image processing controller 11, an HMD controller 12, a position detection controller 13, a treatment instrument operation controller 14, a gesture operation controller 15, and a drive controller 16.

The image processing controller 11 is connected to the image processing unit 50 (described later) to control image processing performed by the image processing unit 50. The HMD controller 12 is connected to the HMD 60 (described later) to control a superimposed display of images on the HMD 60.

The position detection controller 13 includes an HMD position detection controller 13a that detects the 3D position of the HMD 60, an instrument position detection controller 13b that detects the positions of the treatment instruments 80, and a tooth model position detection controller 13c that detects the 3D positions of the tooth models 103. The position detection controller 13 is connected to the position detector 70 (described later) to control position detection performed by the position detector 70 that detects the 3D positions of the HMD 60, the infrared marker 104, and the treatment instruments 80.

The treatment instrument operation controller 14 and the gesture operation controller 15 are connected to the operation unit 40 (41, 42) (described later) to control the operation processing performed by the operation unit 40. The drive controller 16 is connected to the treatment instrument drive unit 30 (described later) to control driving of the treatment instruments 80 performed by the treatment instrument drive unit 30.

The storage unit 20 for storing various items of information used during the practice includes storage media such as a hard disk drive (HDD) and a solid state drive (SSD). The storage unit 20 includes a 3D information storage 21, a patient information storage 22, and a treatment information storage 23 as functional components. The 3D information storage 21 stores 3D positional information about, for example, the treatment instruments 80, the HMD 60, and the manikin patient body 100. The patient information storage 22 stores, for multiple patients allocated in accordance with the treatments to be practiced, treatment information to be referenced during a treatment, including profile information such as the age and the sex of each patient, chart information, and 3D computed tomography (CT) imaging information obtained through X-ray CT imaging, drilling information predesigned for embedding a fixture in implant treatment, and 3D shape data about an implant or other parts. The treatment information storage 23 stores information about treatments including details of multiple procedures, procedural steps, treatment information to be referenced during procedures, treatment instruments for each procedure, and parameters preset for each procedure.

The 3D information stored in the 3D information storage 21 includes 3D information about the shape of the oral cavity 101 and the shapes of the teeth inside the oral cavity, 3D information about the shapes of the treatment instruments 80, and the lengths and the shapes of cutting tools including a cutting drill 91, 3D information about the lengths and the shapes of the parts used in implant treatment such as a fixture, an abutment, a screw, and a crown (implant denture), the 3D positional information described above, and 3D image information about selection operations to be superimposed on a 3D view image S (described later).

Although the storage unit 20 is connected to and controlled by the control unit 10 to read and write various items of information stored or to be stored, the storage unit 20 may be located on the Internet and controlled by the control unit 10 to read and write various items of information through the Internet.

The treatment instrument drive unit 30 drives the treatment instruments 80 (described later). More specifically, the treatment instrument drive unit 30 includes an air turbine driver 31 for supplying air to drive an air turbine handpiece 81, an electricity supplier 32 for supplying electricity to drive a micromotor handpiece 82, a laser beam irradiator 33 for emitting a laser beam having a predetermined wavelength to drive a laser handpiece 83, a scaler driver 34 for driving a scaler handpiece 84, a light irradiator 35 for emitting resin curing light to drive a curing light unit 85, and other driving sources for driving various treatment instruments included in the treatment instruments 80. The treatment instrument drive unit 30 is connected to the drive controller 16 and the treatment instruments 80, and controlled by the drive controller 16 to drive the treatment instruments 80.

The operation unit 40 includes, for example, the foot controller 204. The operation unit 40 includes a treatment instrument operation unit 41 for receiving the operations of the treatment instruments 80 and a gesture operation unit 42 for receiving other operations from the trainee P.

More specifically, the gesture operation unit 42 is an input device that receives gestures from the trainee P, and thus is operable intuitively with a gesture. For example, the gesture operation unit 42 includes the position detector 70 (FIG. 2) including infrared cameras installed above and infrared light emitting diodes (LEDs). The gesture operation unit 42 captures images of the hands and fingers irradiated by the infrared LEDs with the infrared cameras, and performs image analysis to determine the positions of the hands and fingers in a 3D space, thus enabling various motion control operations.

The treatment instrument operation unit 41 is connected to the treatment instrument operation controller 14, and the gesture operation unit 42 is connected to the gesture operation controller 15. The treatment instrument operation unit 41 and the gesture operation unit 42 transmit, to the treatment instrument operation controller 14 or the gesture operation controller 15, input operation information representing an input to the treatment instrument operation unit 41 or the gesture operation unit 42, and operate, through the treatment instrument operation controller 14 and the gesture operation controller 15, the corresponding devices based on the input operation information.

The image processing unit 50 generates or superimposes image information in the field of view of the trainee P. The image processing unit 50 includes a 3D image generator 51 that generates a 3D image to be superimposed in the field of view of the trainee P based on the 3D information stored in the 3D information storage 21, and an image superimposing unit 52 that superimposes, onto the 3D view image S of the trainee P captured by stereo cameras 61 (described later), the 3D image generated by the 3D image generator 51 based on the 3D positional information detected by the position detector 70. The image processing unit 50 is connected to and controlled by the image processing controller 11.

Figure 7A:
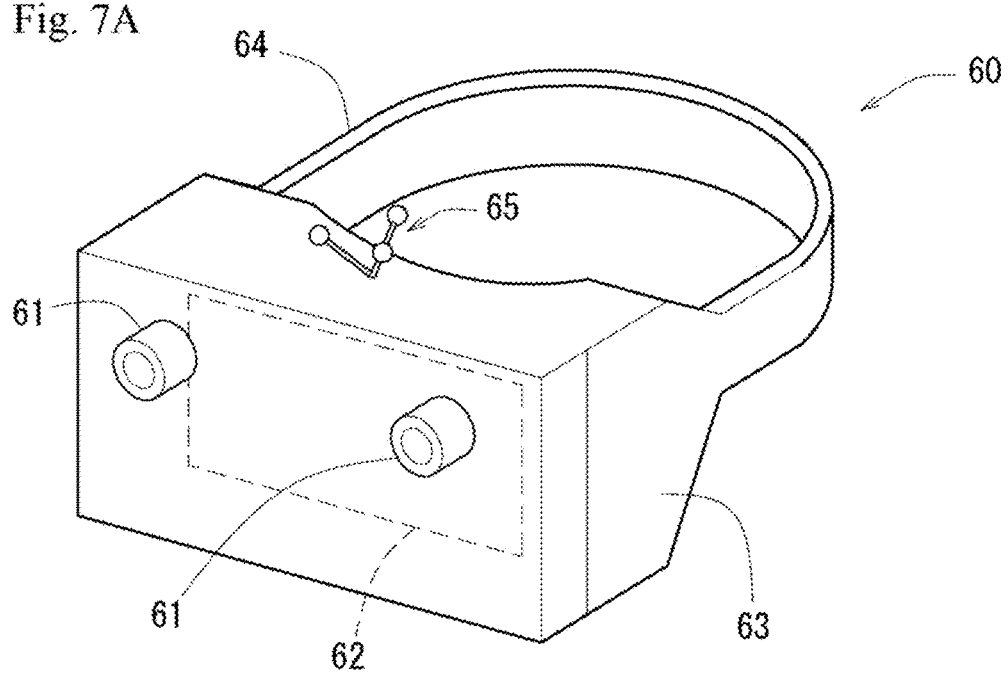
FIGS. 7A and 7B are views of displays.

As shown in FIG. 7A, the HMD 60 worn by the trainee P on the head during the practice includes the stereo cameras 61 that capture 3D view images S corresponding to the field of view of the trainee P, and a display unit 62 that displays the 3D image generated by the image superimposing unit 52 in a superimposed manner. The trainee P wearing the HMD 60 thus practices the procedure while viewing the 3D view image S on which the 3D image is superimposed appearing on the display unit 62.

The HMD 60 includes a body 63 including the stereo cameras 61 and the display unit 62, and a fixing band 64 for fixing the body 63 around the head of the trainee P. In another example, a head-up display (HUD) 60a (FIG. 7B) (described later) may be used in place of the HMD 60.

The HMD 60 further includes an infrared marker 65 that allows detection of the 3D position of the HMD 60 by the position detector 70 (described later). The infrared marker 65 has the same structure as the infrared marker 104. The HMD 60 is connected wirelessly to the HMD controller 12 and controlled by the HMD controller 12.

Figure 4:
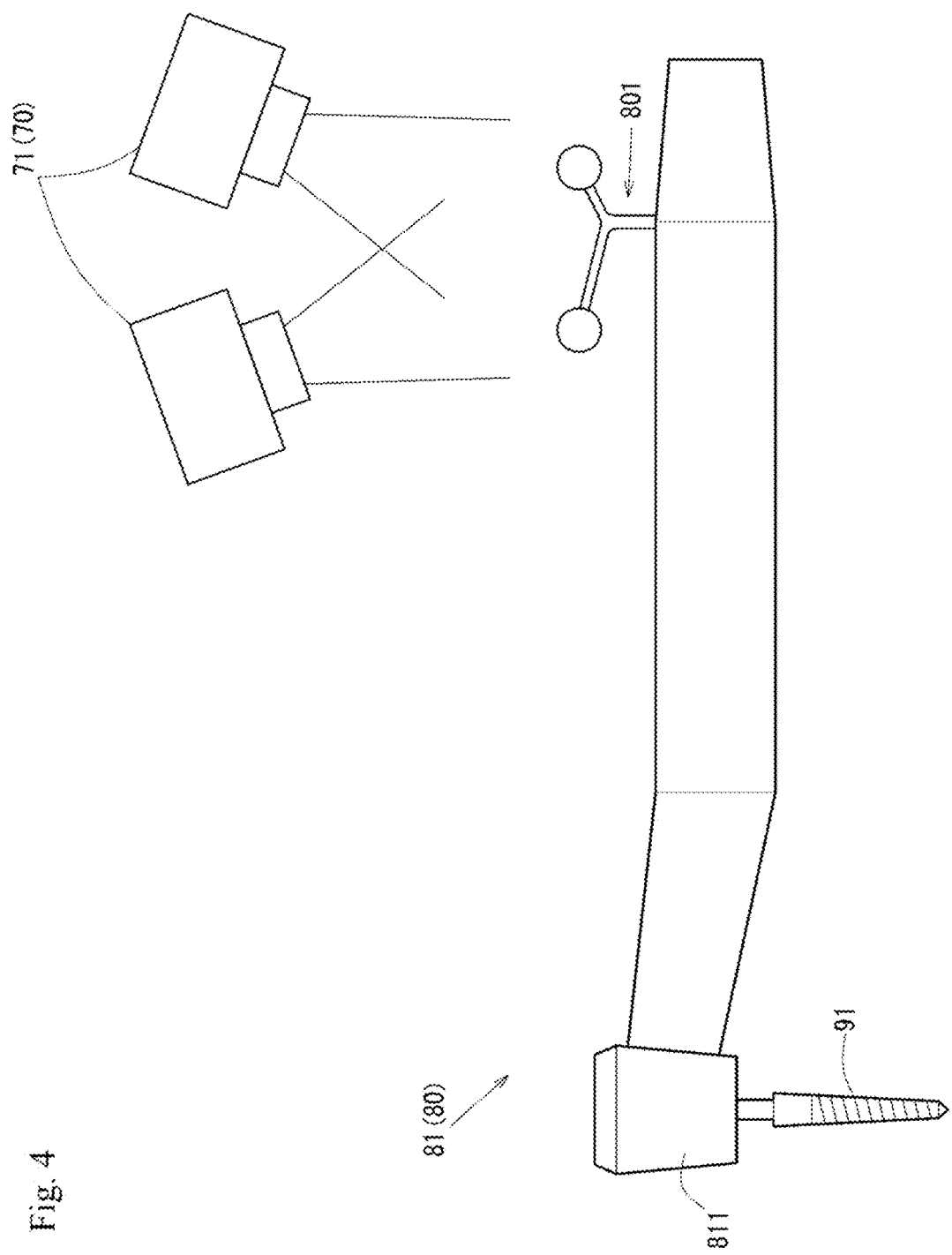
FIG. 4 is a schematic diagram describing detection of the three-dimensional position of the micromotor handpiece.

As shown in FIG. 4, the position detector 70 includes multiple cameras 71. The position detector 70 recognizes the infrared marker 104 on the manikin patient body 100, the infrared marker 65 on the HMD 60, and infrared markers 801 (described later) on the treatment instruments 80 by image recognition, and detects the 3D positions and the orientations of the markers in a 3D space. The position detector 70 is connected to and controlled by the position detection controller 13.

The treatment instruments 80 are applied onto the tooth models 103 during a procedure. The treatment instruments 80 are connected to the treatment instrument drive unit 30 and are operated when driven by the treatment instrument drive unit 30.

One treatment instrument 80 is, for example, the air turbine handpiece 81 shown in FIGS. 3A to 3C and FIG. 4. The air turbine handpiece 81 is a substantially pen-shaped device for cutting by rotating the cutting drill 91 attached to a head 811 at the distal end with air supplied from the air turbine driver 31.

The air turbine handpiece 81 has, on its upper surface, the infrared marker 801 attached to the rear end. The position detector 70 recognizing the infrared marker 801 detects the 3D position and the orientation of the air turbine handpiece 81, thus detecting the orientation of the cutting drill 91 attached to the distal end of the air turbine handpiece 81 and the 3D position of the distal end of the cutting drill 91.

Figure 5:
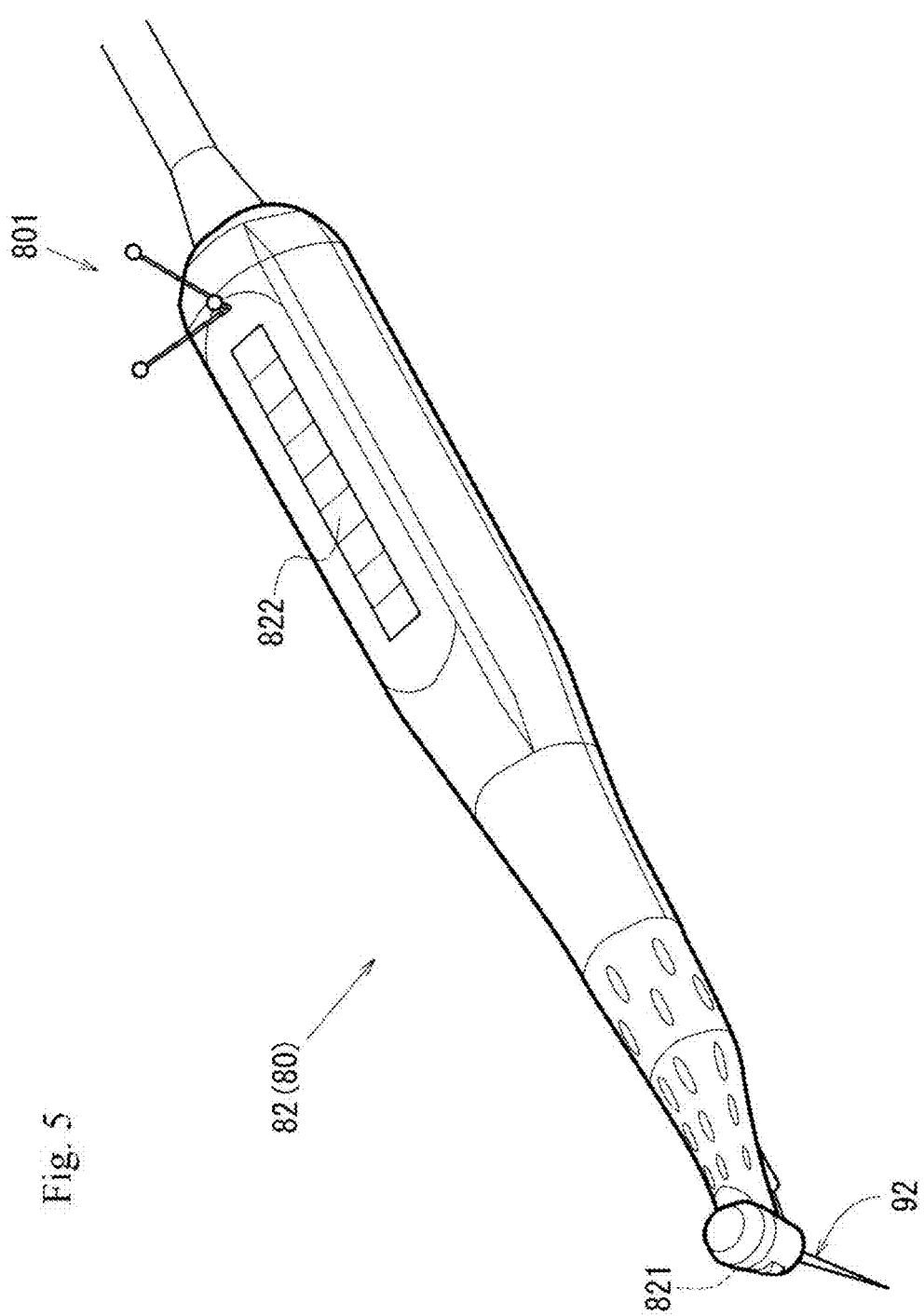
FIG. 5 is a perspective view of a handpiece for root canal treatment.

Another treatment instrument 80 is the micromotor handpiece 82 shown in FIG. 5, which is also substantially pen-shaped. A file 92 as a cutting tool for enlarging a root canal is attached to a head 821 at the distal end of the micromotor handpiece 82. The file 92 is rotated with electricity supplied from the electricity supplier 32 to enlarge a root canal. The micromotor handpiece 82 has, on the upper surface, a torque indicator 822 for indicating torque. For a micromotor handpiece used for implant treatment, a drill burr 93 for an implant procedure may be attached.

Similarly to the air turbine handpiece 81, the micromotor handpiece 82 also includes, on its upper surface, the infrared marker 801 having the same structure as the infrared marker 104 on the rear end. The position detector 70 recognizing the infrared marker 801 detects the 3D position and the orientation of the micromotor handpiece 82, thus detecting the orientation of the file 92 attached to the head 821 at the distal end of the micromotor handpiece 82 and the 3D position of the distal end of the file 92.

Other treatment instruments 80 include, but are not limited to, the laser handpiece 83, the scaler handpiece 84, and the curing light unit 85. The treatment instruments 80 may include any treatment instrument used in procedures performed on the teeth and jawbones in an oral cavity.

Simulated treatments for practice using the dental treatment training system 1 with the above components will now be described in detail.

Before starting the practice, the trainee P first wears the HMD 60 and aligns the body 63 in front of his or her eyes. Once the practice is started, the position detection controller 13 controls the position detector 70 to detect the 3D positions of the HMD 60 and the tooth models 103 (step s1). The stereo cameras 61 included in the HMD 60 are controlled by the HMD controller 12 to capture images to be the 3D view image S.

After the 3D positions of the HMD 60 and the tooth models 103 are detected by the position detector 70, the image processing controller 11 controls the image processing unit 50 to generate the 3D view image S based on the images captured by the stereo cameras 61, and the HMD controller 12 controls the display unit 62 to display the 3D view image S (step s2).

The trainee P wearing the HMD 60 displaying the 3D view image S on the display unit 62 sees the 3D view image S appearing on the display unit 62 as if observing the image within the field of view with naked eyes.

Figure 9:
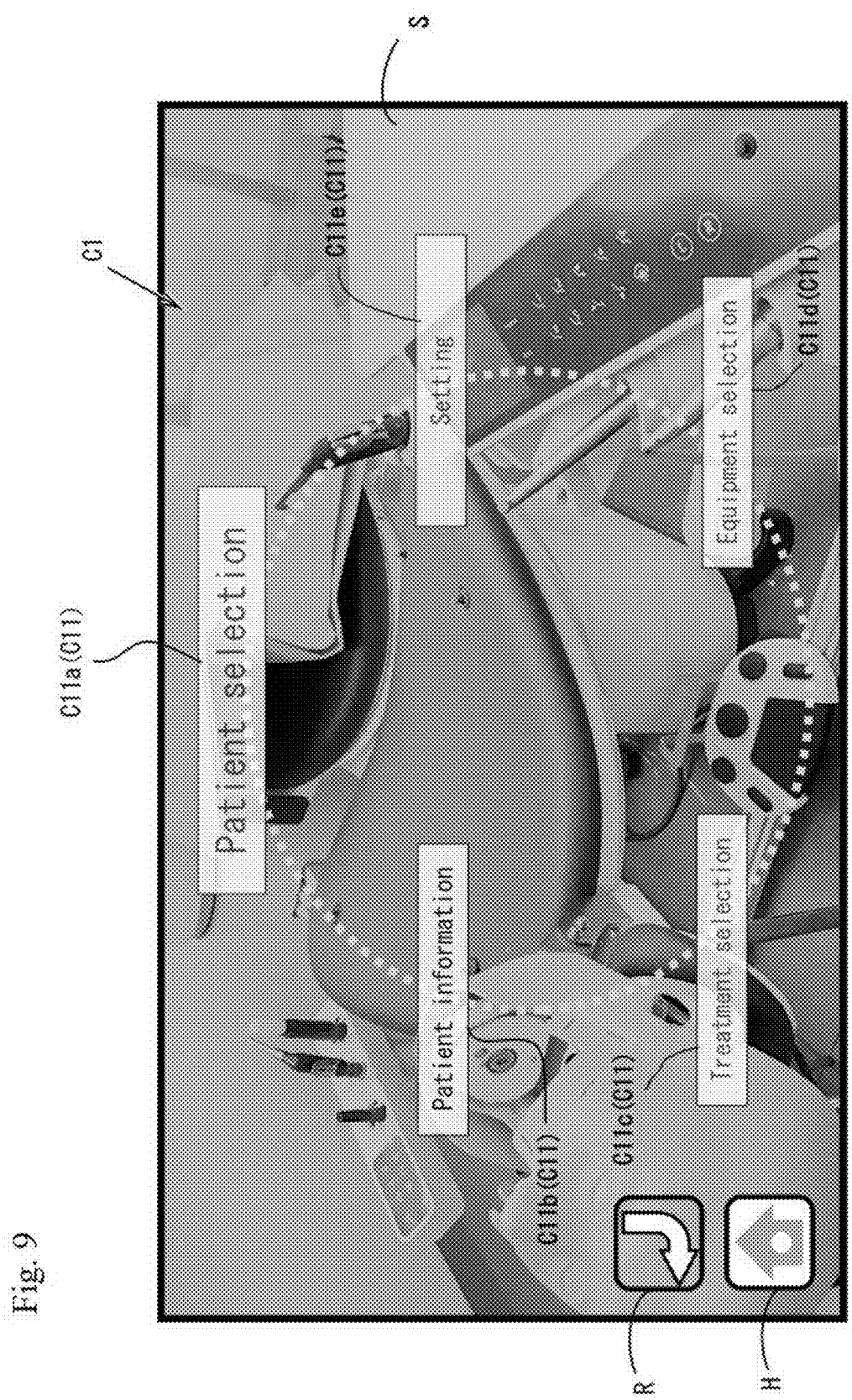
FIG. 9 is a schematic diagram of a menu display.

While seeing the image, the trainee P moves his or her hands to perform a predetermined gesture. The gesture operation unit 42 detects the motion of the hands of the trainee P. The image superimposing unit 52 then superimposes, based on the 3D image information about selection operations read from the 3D information storage 21, a superimposed selection operation display C as shown in FIG. 9 onto the 3D view image S, and displays the resultant image on the display unit 62. The 3D view image S appearing on the display unit 62 includes, at the lower left, a return icon R for returning to a previous display and a home icon H for moving to a home display.

On a menu display schematically shown in FIG. 9, the superimposed selection operation display C is a superimposed menu display C1, in which multiple menu items C11a to C11e are arranged in a circle. In response to the motion of the hands of the trainee P detected by the gesture operation unit 42 (FIG. 1), a hand icon (not shown) moves along the circle. One of the menu items C11a to C11e can be selected in response to a gesture to place the hand on the item to be selected.

When the item C11a "Patient selection" is selected from the menu items C11 shown in FIG. 9 with a gesture operation, a superimposed patient selection display C2 (FIG. 10) (described later) appears. When the item C11b "Patient information" (FIG. 9) is selected, a superimposed patient information selection display C3 (FIG. 11) (described later) appears. When the item C11c "Treatment selection" (FIG. 9) is selected, a superimposed treatment selection display C6 (FIG. 14) (described later) appears. When the item C11d "Equipment selection" (FIG. 9) is selected, a superimposed treatment instrument selection display C7 (FIG. 15) (described later) appears. When the item C11e "Setting" (FIG. 9) is selected, a setting display (not shown) appears for various settings of the dental treatment training system 1.

The trainee P selecting one of the menu items C11 moves the intended menu item C11 to the upper position with a gesture, at which the menu item C11 appears in an enlarged manner and is selected.

Figure 10:
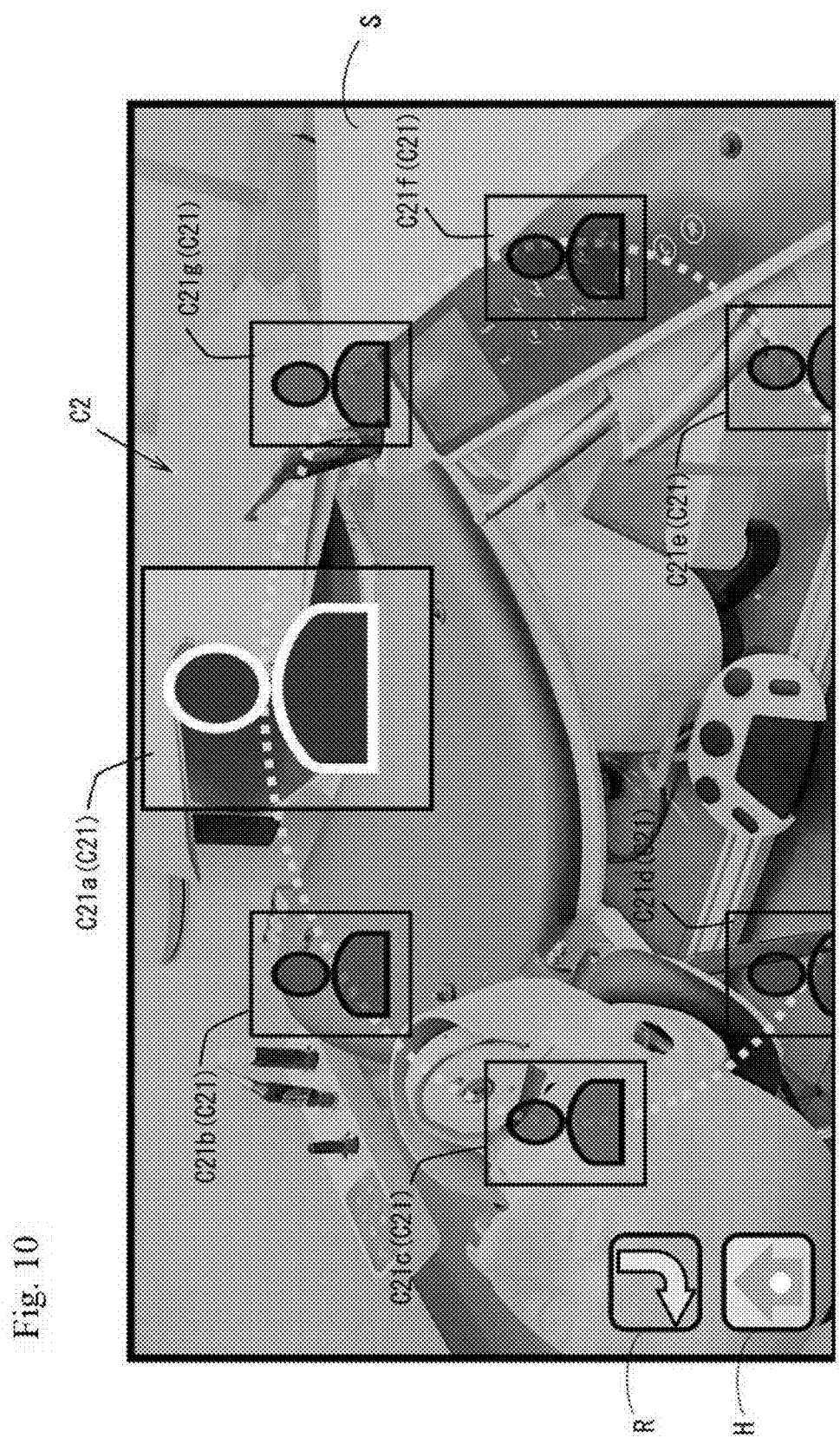
FIG. 10 is a schematic diagram of a patient selection display.

When the trainee P first selects the item C11a "Patient selection" (FIG. 9) with a gesture, the image superimposing unit 52 superimposes, based on the 3D image information about selection operations read from the 3D information storage 21, the superimposed patient selection display C2 shown in FIG. 10 onto the 3D view image S, and displays the resultant image on the display unit 62 (step s3).

Figure 8:
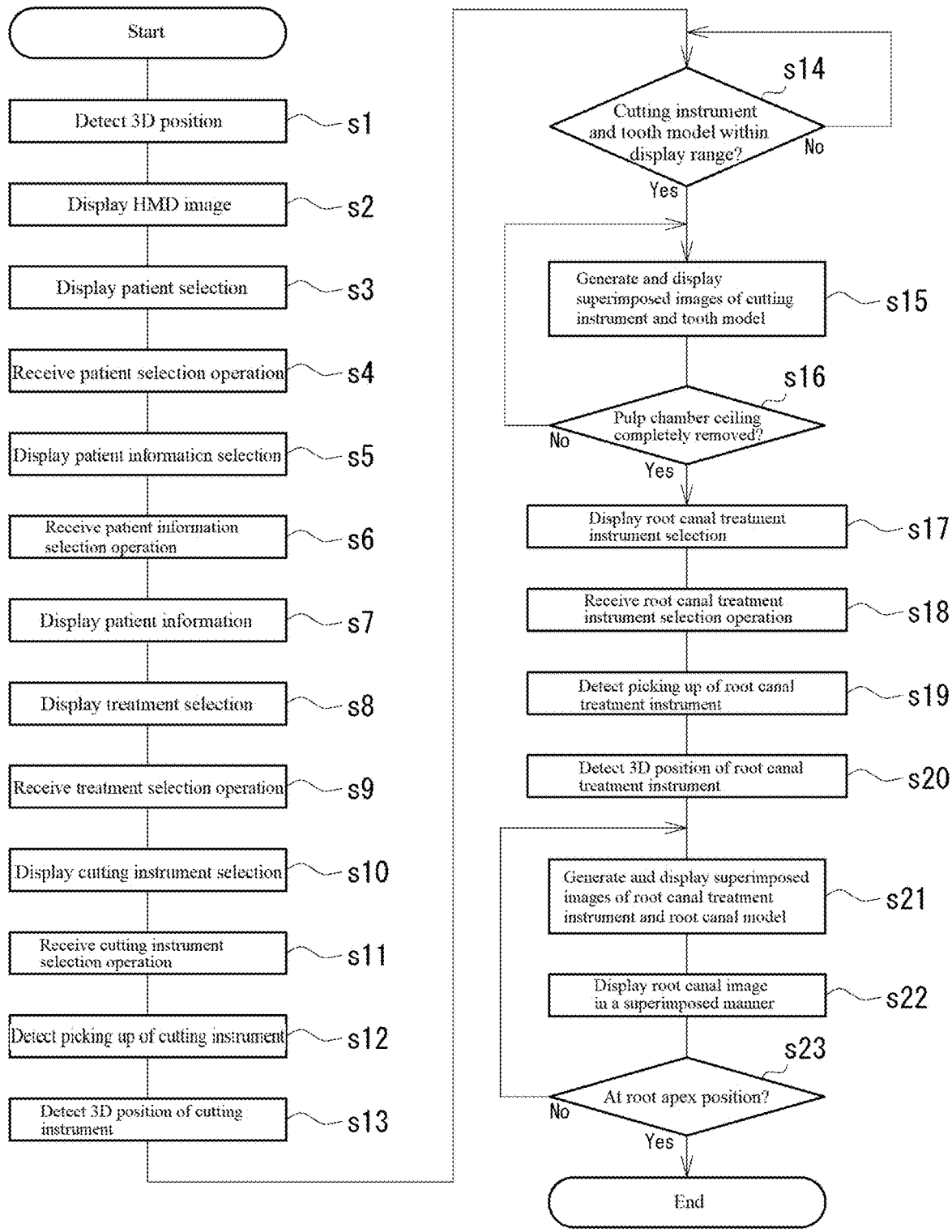
FIG. 8 is a flowchart showing a procedure performed in the practice of root canal treatment.

More specifically, as shown in FIG. 10 and in the flowchart in FIG. 8, the superimposed patient selection display C2 appearing on the display unit 62 includes a patient selection display C21 including multiple patient selection items C21a to C21g displaying patient images arranged in a circle. The trainee P selecting one of the items in the patient selection display C21 moves the intended patient item to the upper position with a gesture to select the item on the patient selection display C21 (step s4).

Figure 11:
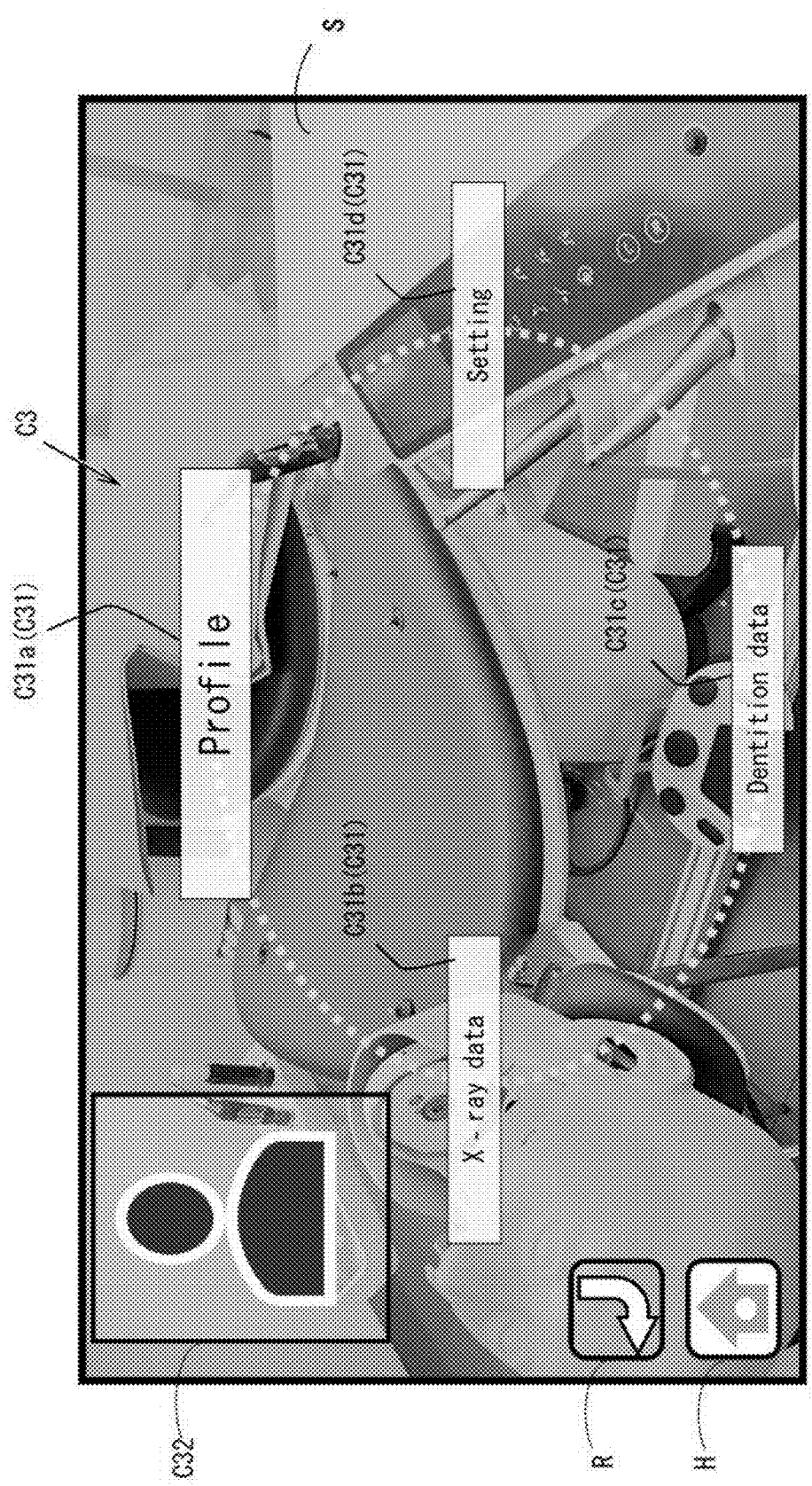
FIG. 11 is a schematic diagram describing selection of a patient profile on a patient information display.

After one item is selected on the patient selection display C21, the image superimposing unit 52 superimposes, based on the 3D image information about selection operations read from the 3D information storage 21, the superimposed patient information selection display C3 shown in FIG. 11 onto the 3D view image S, and displays the resultant image on the display unit 62 (step s5). The superimposed patient information selection display C3 may not appear after an intended patient item is selected on the patient selection display C21. The superimposed patient information selection display C3 may appear when the return icon R or the home icon H is operated to display the superimposed menu display C1 and the item C11b "Patient information" (FIG. 9) is selected.

More specifically, as shown in FIG. 11, the superimposed patient information selection display C3 appearing on the display unit 62 includes a patient image display P displaying an image of the selected patient on the upper left and a patient information selection display C31 including multiple selection items (C31a to C31d) arranged in a circle.

Selecting the item C31a "Profile" on the patient information selection display C31 causes a superimposed patient profile display C4 (FIG. 12) (described later) to appear. Selecting the item C31b "X-ray data" causes a superimposed patient X-ray data display C5 (FIG. 13) (described later) to appear. Selecting the item C31c "Dentition data" causes a superimposed dentition data display (not shown) to appear. Selecting the item C31d "Setting" causes the setting display (not shown) to appear for various settings of the dental treatment training system 1.

Figure 12:
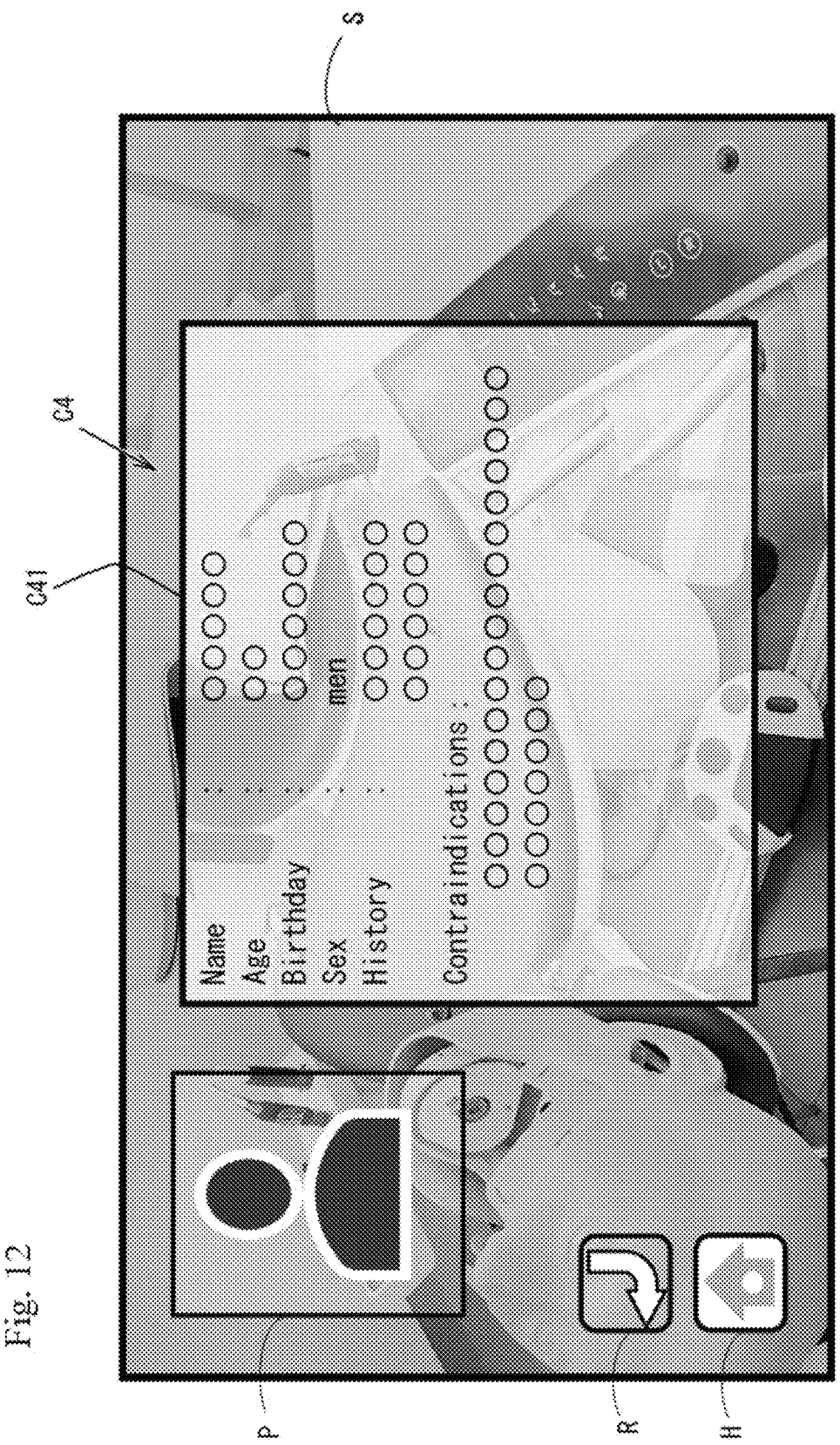
FIG. 12 is a schematic diagram of a patient profile display.

When, for example, the item C31a "Profile" is selected by the trainee P, the superimposed patient profile display C4 appears on the display unit 62 as shown in FIG. 12, including a profile information display C41 for the selected patient together with a patient image display P with an image of the selected patient appearing on the upper left as in the superimposed patient information selection display C3 (step s7).

The profile information display C41 displays multiple profile information items stored in the patient information storage 22, such as the name, age, date of birth, sex, history, and contraindications of the patient.

Figure 13:
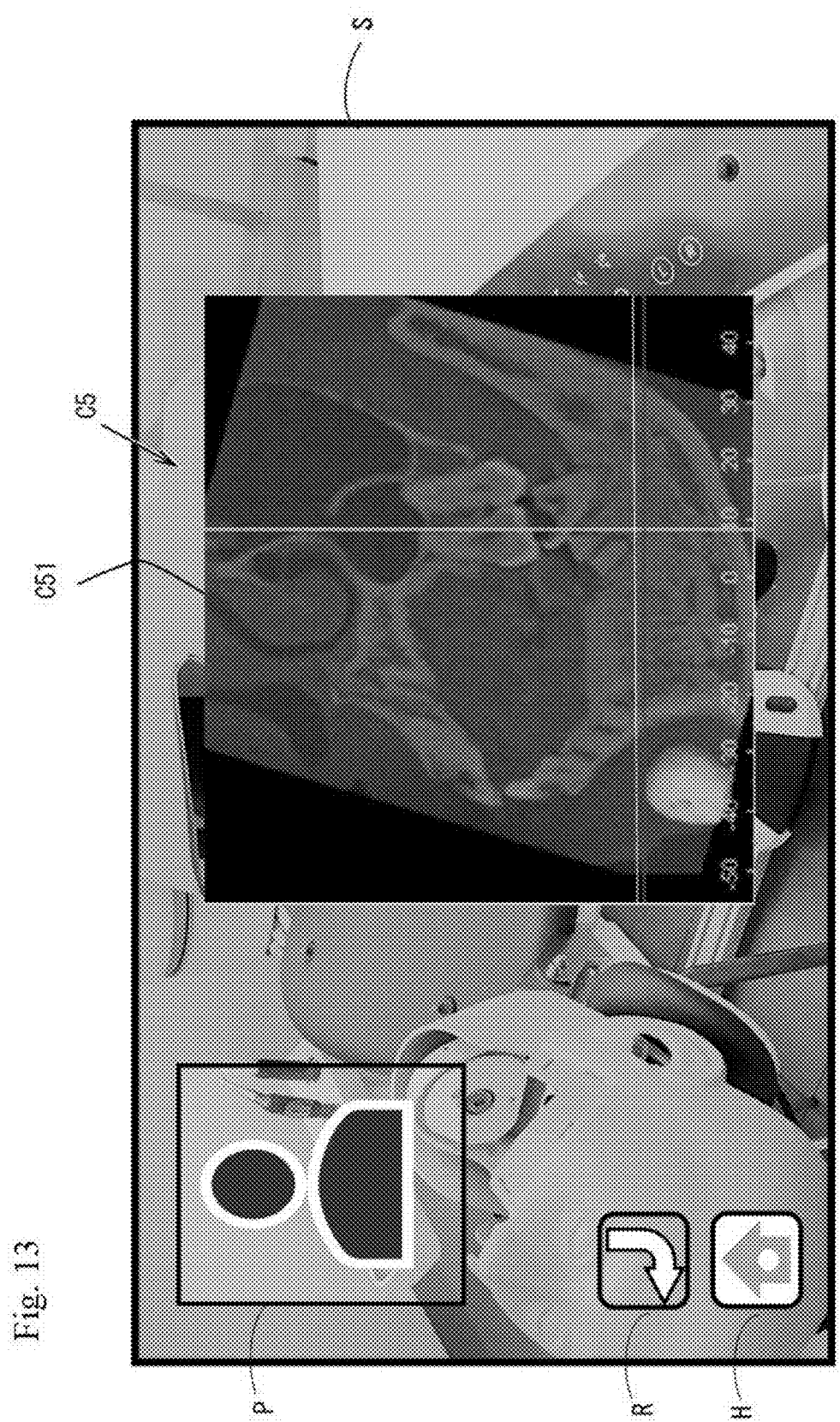
FIG. 13 is a schematic diagram of an X-ray data display.

When the item C31b "X-ray data" is selected on the superimposed patient information selection display C3 shown in FIG. 11, the display unit 62 displays the superimposed patient X-ray data display C5 shown in FIG. 13, including a 3D CT imaging information display C51 representing 3D CT imaging information for the selected patient obtained through X-ray CT imaging, together with the patient image display P displaying the image of the patient. The 3D CT imaging information display C51, which appears as a see-through display, may appear as an opaque display. The profile information display C41 and the 3D CT imaging information display C51 may appear together.

After reviewing the superimposed patient profile display C4 including the profile information display C41 shown in FIG. 12 and the superimposed patient X-ray data display C5 including the 3D CT imaging information display C51 shown in FIG. 13, the trainee P operates the return icon R or the home icon H to display the menu items C11, and selects the item C11c "Treatment selection" (FIG. 9). The image superimposing unit 52 then superimposes, based on the 3D image information about selection operations read from the treatment information storage 23 (FIG. 1), a superimposed treatment selection display C6 shown in FIG. 14 onto the 3D view image S, and displays the resultant image on the display unit 62 (step s8). The superimposed treatment selection display C6 may be directly reached on the superimposed patient X-ray data display C5 (FIG. 13).

Figure 14:
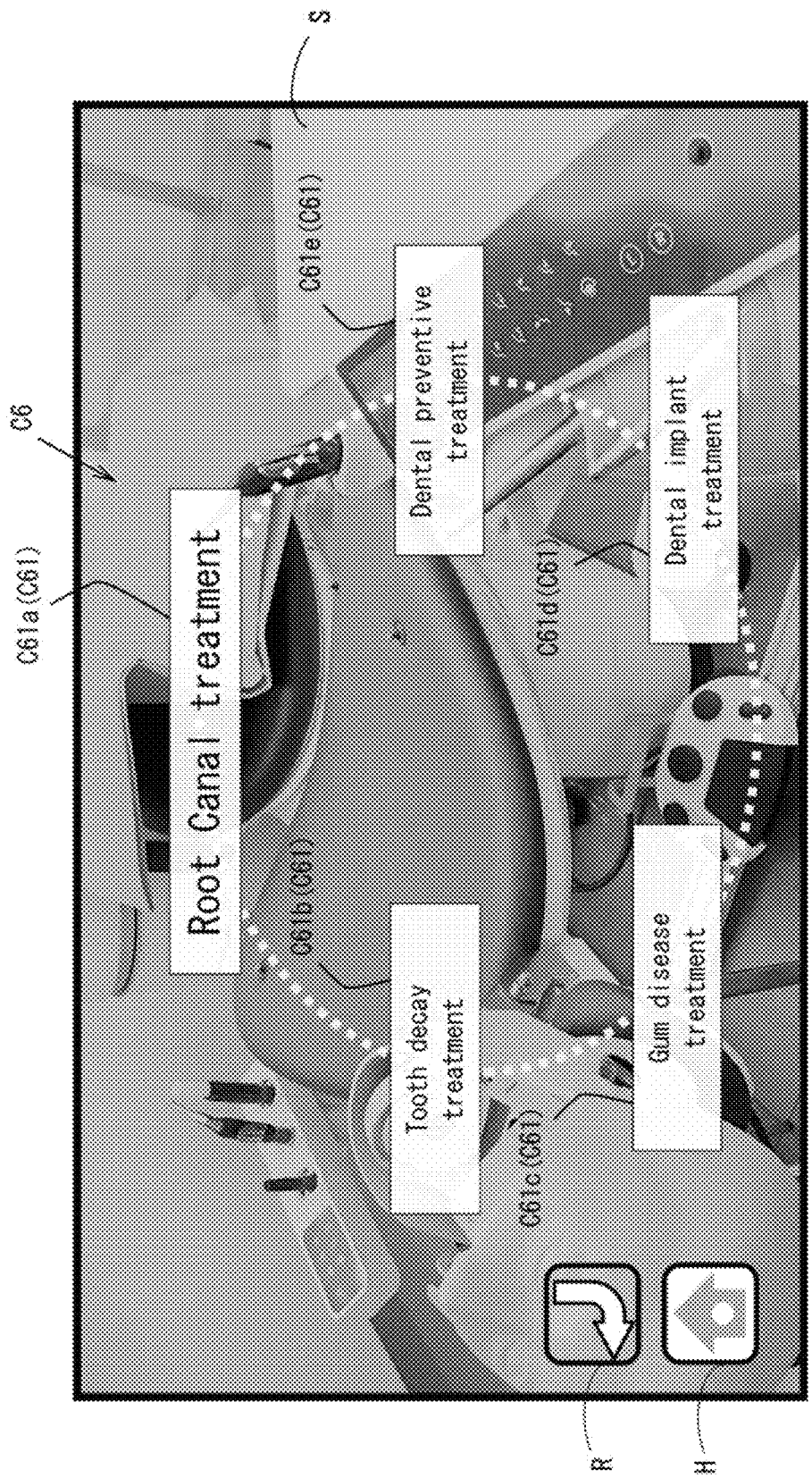
FIG. 14 is a schematic diagram describing selection of root canal treatment on a treatment selection display.

More specifically, as shown in FIG. 14, the superimposed treatment selection display C6 appearing on the display unit 62 includes a treatment selection display C61 including multiple treatment items (C61a to C61d) arranged in a circle. When one treatment item is selected on the treatment selection display C61 (step s9), treatment instruments for the selected treatment are retrieved from the treatment information storage 23 and displayed, as shown in FIG. 15, as a superimposed treatment instrument selection display C7 including the retrieved treatment instrument items in a selectable manner (step s10).

When the item C61a "Root canal treatment" is selected on the treatment selection display C61 shown in FIG. 14, the superimposed treatment instrument selection display C7 (FIG. 15) including, in a selectable manner, multiple treatment instrument items for root canal treatment retrieved from the treatment information storage 23 appears. When the item C61b "Tooth decay treatment" is selected, a superimposed treatment instrument selection display C7 for receiving selection of a treatment instrument item for tooth decay treatment appears. When the item C61c "Gum disease treatment" is selected, a superimposed treatment instrument selection display C7 for receiving selection of a treatment instrument item for gum disease treatment appears. When the item C61d "Dental implant treatment" is selected, a superimposed treatment instrument selection display C7 for receiving selection of a treatment instrument item for implant treatment appears. When the item C61e "Dental preventive treatment" is selected, a superimposed treatment instrument selection display C7 for receiving selection of a treatment instrument item for dental preventive procedure appears.

Figure 15:
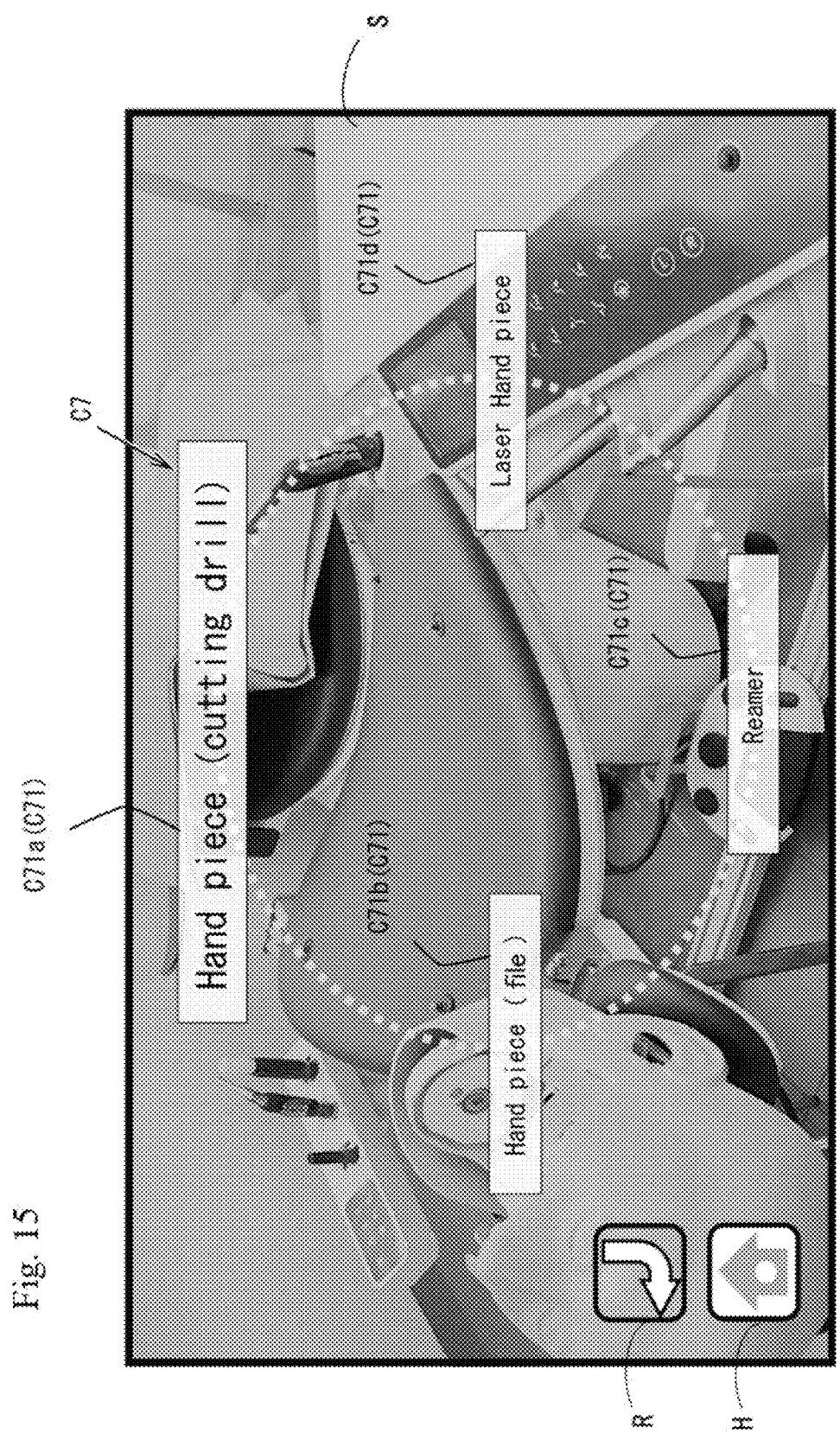
FIG. 15 is a schematic diagram describing selection of a handpiece for cutting on a treatment instrument selection display.

For example, when the trainee P selects the item C61a "Root canal treatment" from the multiple items on the treatment selection display C61 with a gesture, the superimposed treatment instrument selection display C7 including a treatment instrument selection display C71 shown in FIG. 15 appears on the display unit 62 for selecting a cutting instrument to be used for root canal treatment.

As shown in FIG. 15, the treatment instrument selection display C71 on the superimposed treatment instrument selection display C7, which appears after the item C61a "Root Canal treatment" is selected, includes an item C71a "Hand piece (cutting drill)" for selecting the handpiece receiving the cutting drill 91, an item C71b "Hand piece (file)" for selecting the handpiece receiving the file 92 as a cutting tool, an item C71c "Reamer" for selecting a file alone as a cutting tool, and an item C71d "Laser Hand piece" for selecting a laser handpiece as a cutting instrument. These items are arranged in a circle on the display.

For example, as shown in the flowchart in FIG. 8, when the item C71a "Hand piece (cutting drill)" is selected from the multiple items on the treatment instrument selection display C71 with a gesture performed by the trainee P and picking up the air turbine handpiece 81 is detected (step s12), the position detection controller 13 controls the position detector 70 to recognize, by image recognition, the infrared marker 801 on the air turbine handpiece 81 with the cameras 71 and detect the 3D position of the air turbine handpiece 81 (step s13).

When the 3D positions of the air turbine handpiece 81 and the tooth models 103 detected by the position detector 70 are within the range of the 3D view image S appearing on the display unit 62 in the HMD 60 (Yes in step s14), the image processing controller 11 causes the image processing unit 50 to generate, based on the 3D information stored in the 3D information storage 21, 3D images of the air turbine handpiece 81 that has been picked up and the tooth models 103 and superimpose the generated images on the 3D view image S (step s15). When the air turbine handpiece 81 and the tooth models 103 are outside the range of the 3D view image S (No in step s14), the practice continues without 3D images of the air turbine handpiece 81 and the tooth models 103 being superimposed on the 3D view image S.

Either the tooth models 103 or the air turbine handpiece 81 alone may be superimposed. When the tooth models 103 or the air turbine handpiece 81 is within the range of the 3D view image S but includes an invisible portion that the trainee P cannot observe visually due to the 3D positional relationship between the tooth models 103 and the air turbine handpiece 81, a 3D image representing the invisible portion may be generated and superimposed on the 3D view image S.

The trainee P thus performs the practice while viewing the 3D view image S on which the 3D images of the air turbine handpiece 81 and the tooth models 103 are superimposed. For the practice of root canal treatment, the pulp chamber ceiling of a target tooth model 103 is cut with the air turbine handpiece 81 until the orifice of the root canal is exposed (No in step s16).

After the pulp chamber ceiling is cut completely (Yes in step s16), the superimposed treatment instrument selection display C7 appears on the 3D view image S for selecting a treatment instrument for root canal treatment to enlarge the root canal (step s17).

For example, the trainee P selects, with a gesture, the item C71b "Hand piece (file)" on the treatment instrument selection display C71 appearing on the superimposed treatment instrument selection display C7 (step s18) to enlarge the root canal. When picking up the micromotor handpiece 82 is detected (step s19), the position detection controller 13 controls the position detector 70 to recognize, by image recognition, the infrared marker 801 on the micromotor handpiece 82 with the cameras 71 and detect the 3D position of the micromotor handpiece 82 (step s20).

The 3D images of the micromotor handpiece 82 and the tooth models 103, for which the 3D positions have been detected by the position detector 70, are generated based on the 3D information stored in the 3D information storage 21, and are superimposed on the 3D view image S as shown in FIG. 16 (step s21).

In FIG. 16, a prestored 3D X-ray image representing an invisible portion N inside the root canal, which the trainee P cannot observe visually due to the 3D positional relationship between the tooth models 103 and the micromotor handpiece 82, is generated and superimposed on the 3D view image S. However, the entire or partial 3D images of both or either the tooth models 103 and/or the micromotor handpiece 82 may be superimposed.

For root canal treatment, the tip of the file 92 attached to the micromotor handpiece 82 is expected to reach the position of the root apex, which is at the tip the root canal. Although the trainee P may determine whether the tip of the file 92 has reached the position of the root apex by using a root canal length measuring device during root canal cutting using the file 92, the thickness and the length of the file 92 attached to the head 821 of the micromotor handpiece 82, for which the 3D position has been detected by the position detector 70, are stored in the treatment information storage 23. This allows calculation of the 3D position of the tip of the file 92. The X-ray CT image information about the position and the shape of the root canal inside the tooth model 103 is also stored in the 3D information storage 21. This also allows calculation of the cutting state (application state) of the file 92 relative to the root canal, that is, calculation of the 3D positional relationship of the file 92 relative to the root canal.

Figure 17:
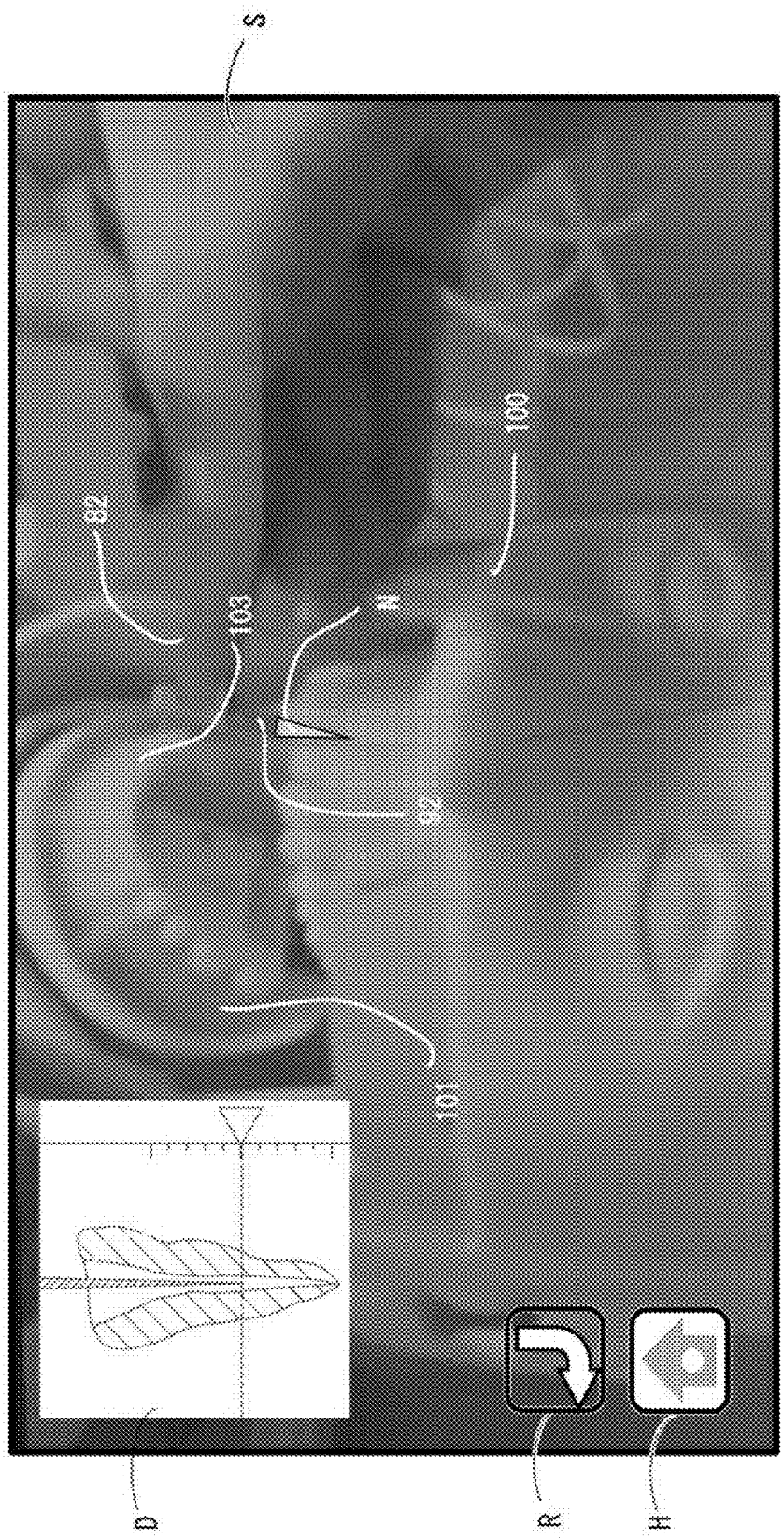
FIG. 17 is a schematic diagram describing a superimposed display of an application state image during the practice of root canal cutting.

This also allows a superimposed display of a root canal cutting state image display D including the file 92 cutting into the root canal to enlarge the root canal (step s22), as shown in FIG. 17.

The root canal cutting state image display D includes a cross-sectional image of the file 92 cutting into and enlarging the root canal superimposed onto a cross-sectional X-ray CT image of the tooth model 103 along the root canal inside the tooth model 103. As the position detector 70 detects the movement of the file 92, the cross-sectional image of the file 92 on the 3D view image S also moves. The root canal cutting state image display D may appear as a see-through display.

While viewing the 3D view image S on which the root canal cutting state image display D is superimposed, in addition to the 3D image of the invisible portion N, the trainee P cuts the root canal with the file 92 until the tip of the file 92 reaches the position of the root apex at the tip of the root canal (No in step s23). When the tip of the file 92 reaches the position of the root apex, the practice of the root canal treatment procedure using the treatment instrument 80 is complete.

Figure 18:
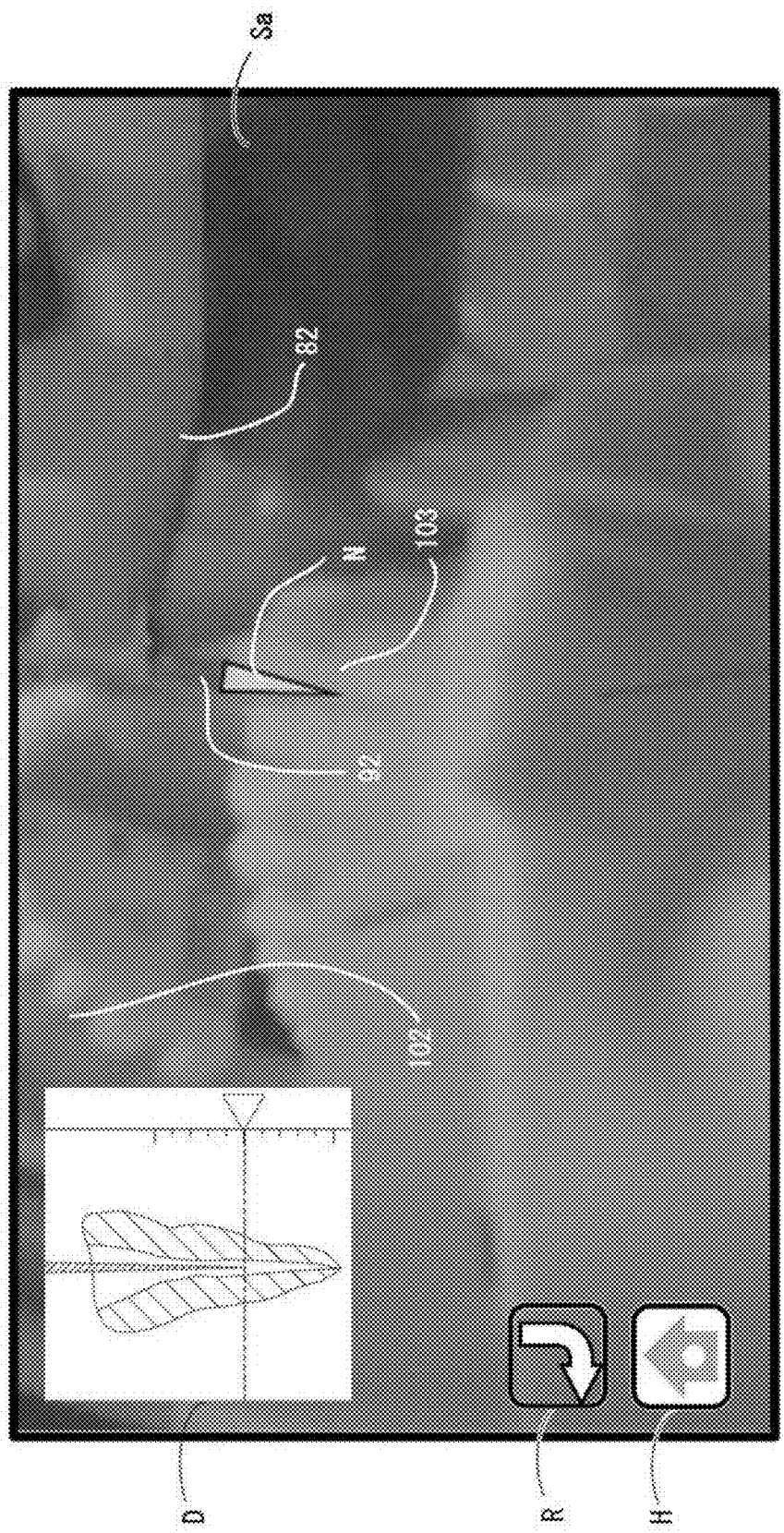
FIG. 18 is a schematic diagram describing an enlarged superimposed display of the application state image during the practice of root canal cutting.

Enlarging the root canal that includes cutting the root canal involves high accuracy. Thus, the trainee P performs the procedure while carefully observing the site. As shown in FIG. 18, the 3D view image S on the display unit 62 may appear as an enlarged 3D view image Sa. The enlarged 3D view image may have a narrower range of field of view than a normal 3D view image, but provides a more detailed view of the target site.

Figure 19:
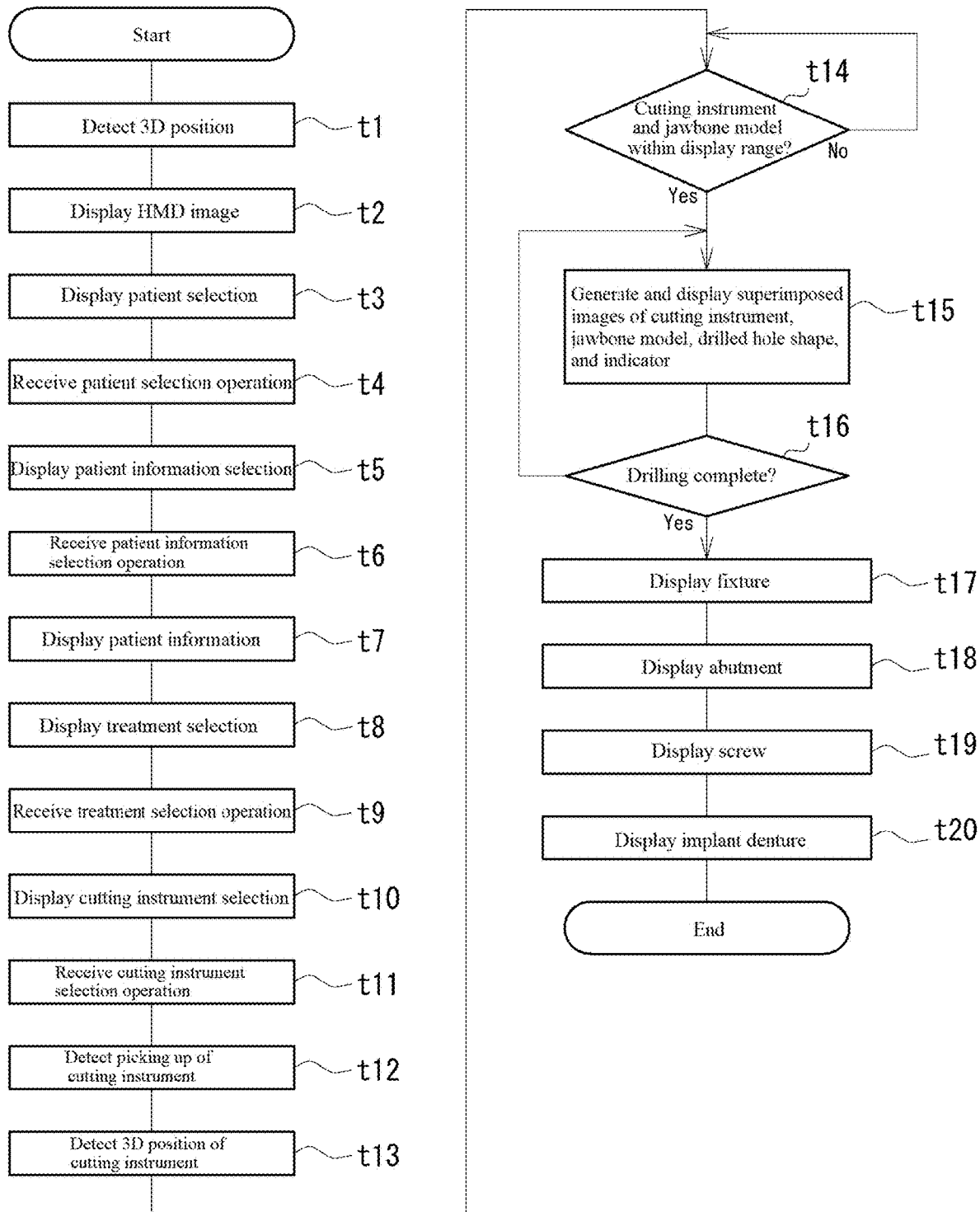
FIG. 19 is a flowchart showing a procedure performed in the practice of implant treatment.

A simulated implant treatment performed using the dental treatment training system 1 will now be described with reference to FIG. 19. The same processes as in the practice of root canal treatment described above will not be described. Steps t1 to t13 in this implant treatment practice are the same as the corresponding steps in the root canal treatment practice described above, except that the item C61d "Dental implant treatment" is selected on the superimposed treatment selection display C6 in step t8 (FIG. 14), and the micromotor handpiece 82 receiving the drill burr 93 for implant treatment is selected on the superimposed treatment instrument selection display C7 displaying treatment instruments for implant treatment (step t11), and will not be described.

Implant treatment includes drilling a hole for receiving a fixture in a jawbone without reaching, for example, the mandibular canal, placing a fixture in the drilled receiving hole, and attaching an abutment, a screw, and an implant denture to the embedded fixture in the stated order. In the root canal treatment described above, a tooth model 103 is cut or the root canal of the tooth model 103 is cut. In the implant treatment procedure, the target site is the jawbone, in which a fixture is to be placed. The jaw model 102 is drilled in this practice.

In implant treatment in reality, the procedure is preceded by predesigning a receiving hole for receiving a fixture, and prestoring 3D information about the position and the shape of the hole and 3D information about the fixture, abutment, screw, and implant denture to be attached into the patient information storage 22. The same applies to the practice in the simulated implant treatment.

As described above, in step t8, the item C61d "Dental implant treatment" is selected on the superimposed treatment selection display C6 (FIG. 14). The micromotor handpiece 82 receiving the drill burr 93 for implant treatment is then selected on the superimposed treatment instrument selection display C7 displaying treatment instruments for implant treatment (step t11). After picking up the micromotor handpiece 82 is detected (step t12), the position detection controller 13 controls the position detector 70 to recognize, by image recognition, the infrared marker 801 on the micromotor handpiece 82 with the cameras 71 and detect the 3D position of the micromotor handpiece 82 (step t13).

When the 3D positions of the micromotor handpiece 82 and the jaw model 102 detected by the position detector 70 are within the range of the 3D view image S appearing on the display unit 62 in the HMD 60 (Yes in step t14), the image processing controller 11 causes the image processing unit 50 to generate, based on the 3D information stored in the 3D information storage 21, a 3D image of a predesigned receiving hole e for receiving a fixture in addition to the 3D images of the micromotor handpiece 82 that has been picked up and the jaw model 102 and to superimpose the generated 3D images on the 3D view image S (FIG. 20). The image processing controller 11 also causes the image processing unit 50 to superimpose an indicator display M (FIG. 21) for drilling the receiving hole on the 3D view image S (step t15). When the micromotor handpiece 82 and the jaw model 102 are outside the range of the 3D view image S (No in step t14), the practice continues without 3D images of the micromotor handpiece 82 and the jaw model 102 being superimposed on the 3D view image S.

Figure 21:
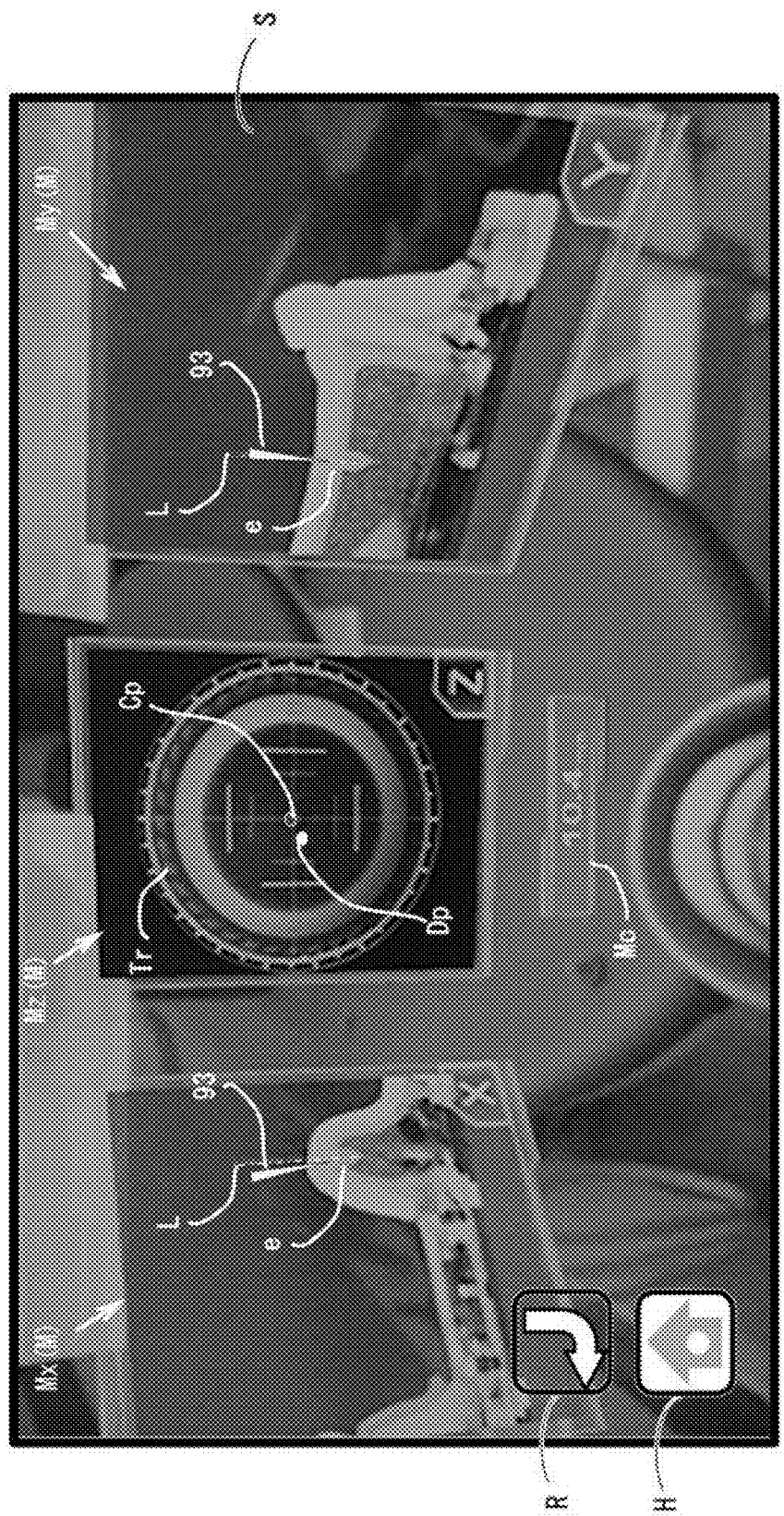
FIG. 21 is a schematic diagram describing a superimposed display of indicators during the practice of implant treatment using the handpiece for cutting.

As shown in FIG. 21, the indicator display M includes a circular indicator Mz in the middle, an X-section indicator Mx on the left, a Y-section indicator My on the right, and a numerical indicator Mc below the circular indicator Mz. The numerical indicator Mc numerically indicates the distance remaining between the tip of the drill burr 93 and the bottom of the receiving hole (predesigned receiving hole e) in the depth direction.

The X-section indicator Mx and the Y-section indicator My show longitudinal cross-sectional views through the target site, that is, through the receiving hole to be drilled. The cross-sectional views are along X-axis and Y-axis in a plane direction and each perpendicular to the direction of the central axis of the receiving hole, which is defined as Z-direction.

The X-section indicator Mx and the Y-section indicator My both include a superimposed display of the predesigned receiving hole e and an ideal central axial line L representing the preset drilling direction of the drill burr 93 for drilling the receiving hole. The X-section indicator Mx and the Y-section indicator My both also include a superimposed display of the 3D image of the drill burr 93 indicating the 3D position of the drill burr 93 during drilling, which is detected by the position detector 70 recognizing, by image recognition, the infrared marker 801 on the micromotor handpiece 82. The direction of the central axis and the depth of the receiving hole are appropriately preset through implant simulation and with X-ray CT images.

The circular indicator Mz indicates the center of the receiving hole as viewed in the vertical direction, with the right-left direction defined as X-direction and the up-down direction defined as Y-direction.

The center of the circular indicator Mz is aligned with the central axis of the receiving hole (predesigned receiving hole e). The reference lines for X-direction and Y-direction cross each other where the right-left direction and the up-down direction are perpendicular to each other. The circular indicator Mz also includes additional lines located at equal intervals in the directions crossing the reference lines.

At the intersection of the crossing reference lines, that is, at the center of the circular indicator Mz, the center of the receiving hole (predesigned receiving hole e) appears as a center point Cp. Near the center point Cp, the planar position of the basal end portion of the drill burr 93 appears as a drill point Dp.

The circular indicator Mz also includes a concentric circular tip-position display ring Tr. The tip-position display ring Tr indicates the distance remaining between the tip of the drill burr 93 and the bottom of the receiving hole (predesigned receiving hole e) in the depth direction. The tip-position display ring Tr indicates the remaining distance between the tip of the drill burr 93 and the bottom of the receiving hole (predesigned receiving hole e) in the depth direction with its diameter, that is, with the size of the circular ring. A smaller diameter indicates a smaller remaining distance to the bottom of the receiving hole (predesigned receiving hole e) in the depth direction. Thus, after the tip of the drill burr 93 reaches the bottom of the receiving hole (predesigned receiving hole e), that is, the receiving hole (predesigned receiving hole e) is drilled completely, the tip-position display ring Tr aligns with the center point Cp and thus disappears.

In FIG. 21, the X-section indicator Mx indicates that the basal end portion of the drill burr 93 deviates leftward from the central axial line L, and the Y-section indicator My indicates that the basal end portion of the drill burr 93 slightly deviates rightward from the central axial line L. The circular indicator Mz thus indicates the drill point Dp deviating from the center point Cp by the amounts corresponding to deviations in X-direction and Y-direction.

While viewing the 3D view image S including the superimposed 3D images of the micromotor handpiece 82, the jaw model 102, and the predesigned receiving hole e, or the superimposed indicator display M, the trainee P drills the predetermined portion in the jaw model 102 to form the predesigned receiving hole e without reaching the mandibular canal (No in step t16). This completes the drilling to form the predesigned receiving hole e. After the receiving hole is formed (Yes in step t16), the image processing controller 11 generates the 3D image of the fixture stored in the 3D information storage 21, and superimposes the generated image on the 3D view image S (step t17).

After the fixture is placed completely, the 3D image of the abutment is generated and superimposed on the 3D view image S (step t18). After the abutment is placed completely, the 3D image of the screw is generated and superimposed on the 3D view image S (step t19). After the screw is placed completely, the 3D image of the implant denture is generated and superimposed on the 3D view image S (step t20). After the implant denture is placed completely, the practice of implant treatment is complete.

As described above, the dental treatment training apparatus 2 for providing the simulated treatment in which the treatment instrument 80 is applied onto the tooth model 103 includes the display unit 62 that displays, in a manner superimposed on the 3D view image S corresponding to the field of view of the trainee P, the 3D image information based on predefined 3D information about the tooth model 103 and the treatment instrument 80, the position detector 70 that detects the 3D positional information about the tooth model 103, the treatment instrument 80, and the display unit 62, and the control unit 10 that causes the display unit 62 to display, in a superimposed manner, 3D image information about at least the invisible portion corresponding to the item selected on the superimposed selection operation display C for selecting an item associated with the simulated treatment based on the 3D positional information detected by the position detector 70. The apparatus allows the trainee P to practice complex treatments involving high accuracy and skill levels.

More specifically, the dental treatment training apparatus 2 includes the display unit 62 that displays, in a superimposed manner, the 3D image information based on predefined 3D information about the tooth model 103 and the treatment instrument 80 on the 3D view image S corresponding to the field of view of the trainee P, the position detector 70 that detects the 3D positional information about the tooth model 103, the treatment instrument 80, and the display unit 62, and the control unit 10 that causes the display unit 62 to display, in a superimposed manner, 3D image information about at least the invisible portion of the tooth model 103 and the treatment instrument 80 corresponding to the item selected on the superimposed selection operation display C based on the 3D positional information detected by the position detector 70. The dental treatment training apparatus 2 detects all relative 3D positional relationships between the tooth model 103, the treatment instrument 80, and the display unit 62, and thus appropriately superimposes the image representing the invisible portion in the field of view of the trainee P. Thus, the dental treatment training apparatus 2 provides the situation of the invisible portion being observed visually in the simulated treatment, thus allowing the trainee P to precisely practice the complex treatments involving high accuracy and skill levels.

The predefined 3D information about the tooth model 103 includes 3D information about the inside of the tooth model 103, thus allowing the trainee P to more precisely practice the complex treatments.

More specifically, the predefined 3D information about the tooth model 103, which includes the 3D information about the inside of the tooth model 103, can provide the situation of the treatment state inside the dental model being observed visually in the practice, thus allowing the trainee P to more precisely practice a complex treatment.

The superimposed selection operation display C includes the superimposed treatment selection display C6 that receives selection of a simulated treatment to be performed, and the superimposed treatment instrument selection display C7 that receives selection of a treatment instrument 80 to be used. The control unit 10 displays, in a superimposed manner, predefined 3D information about the tooth model 103 corresponding to the simulated treatment selected on the superimposed treatment selection display C6 and predefined 3D information about the treatment instrument 80 selected on the superimposed treatment instrument selection display C7. This structure allows selection of the intended treatment or the treatment associated with a preset symptom and selection of the treatment instrument 80 for the selected treatment, and thus allows the trainee P to more precisely practice a complex treatment while displaying, in a superimposed manner, the predefined 3D information about the tooth model 103 corresponding to the selected simulated treatment and the predefined 3D information about the selected treatment instrument 80.

The superimposed selection operation display C also includes the superimposed patient selection display C2 that receives selection of an item from multiple items on the patient selection display C21 each including preset information items about a patient, and the superimposed patient information selection display C3 that receives selection of an item on the patient information selection display C31, which is a preset information item associated with the simulated treatment from the preset information items on the patient selection display C21. The control unit 10 displays, in a superimposed manner, the information item selected on the patient information selection display C31. This structure allows selection and review of the preset information about the selected simulated patient and determination of the treatment allocated to the simulated patient based on the preset information, thus allowing the trainee P to practice in a situation similar to a clinical situation.

The control unit 10 also causes the display unit 62 to display, in a superimposed manner, the root canal cutting state image display D as an image representing the application state of the treatment instrument 80 onto the tooth model 103 during the simulated treatment. This structure provides the situation of the application state at a site less easily observable being observed visually in the simulated treatment, thus allowing the trainee P to precisely practice a more complex treatment in the simulated treatment.

The relative position of the tip of the drill burr 93 relative to the preset center point Cp in the tooth model 103 to be drilled with the drill burr 93 is superimposed on the indicator display M. This allows visual observation for accurately determining the relative position of the drill burr 93 relative to the center point Cp located at a site that cannot be observed visually, thus preventing, for example, a failure such as excessive cutting and allowing more accurate practice during the simulated treatment.

The dental treatment training system 1 including the dental treatment training apparatus 2 and the manikin patient body 100 with the oral cavity 101 in which the tooth models 103 is mounted in a replaceable manner can provide a more realistic treatment situation for practice than the training system including merely tooth models or jaw models on which the tooth models are mounted. The replaceable tooth models 103 can be cut with a real treatment instrument 80, thus allowing repeated practice in a more realistic situation than, for example, a system merely providing virtual images for simulated treatments.

The components described in the above embodiments correspond to the components in the claimed invention in the manner described below: the oral cavity corresponds to the oral cavity 101, the dental model to the tooth model 103, the treatment instrument to the treatment instrument 80, the display unit to the display unit 62 (see-through display unit 62a), the 3D position detector to the position detector 70, the selection unit to the superimposed selection operation display C, the image information to the 3D image information, the display control unit to the control unit 10, the treatment selection unit to the superimposed treatment selection display C6, the instrument selection unit to the superimposed treatment instrument selection display C7, the patient selection unit to the superimposed patient selection display C2, the treatment information selection unit to the superimposed patient information selection display C3, the state indication image to the root canal cutting state image display D or the indicator display M, the cutting instrument to the file 92, and the cutting end point to the center point Cp. However, the invention may be implemented in many embodiments other than the embodiments described above.

Figure 22:
FIG. 22 is a schematic diagram describing selection on a selection display.

In the example described above, the superimposed menu display C1 shown in FIG. 9 includes multiple menu items C11 arranged in a circle movable in a circular path, when selected, with a gesture operation performed by the trainee P. However, the superimposed selection operation display C for receiving various selection operations may appear in another manner. For example, as shown in FIG. 22, the superimposed selection operation display C may appear as multiple superimposed selection item displays C8, in which multiple selection items C81 are arranged in parallel on planes in a 3D space and superimposed on the 3D view image S. The trainee P may move, with a gesture operation, an intended item C81 and captures and moves the item toward him or her. This gesture control method called Leap Motion (registered trademark) may be used to allow a gesture operation performed by the trainee P to serve as a selection operation.

Figure 23:
FIG. 23 is a schematic diagram of an image superimposed on a manikin patient body.

In the above example, the manikin patient body 100 is a head model with the oral cavity 101 containing the tooth models 103 mounted on the jaw models 102. In another example, a virtual image of a full body model may be superimposed on the manikin patient body 100 in the simulated treatment. In the above example, the 3D images of the jaw models 102, the tooth models 103, and the treatment instrument 80 are superimposed on the 3D view image S including the image of the manikin patient body 100. In another example, as shown in FIG. 23, 3D image information about the manikin patient body 100 may be stored in the 3D information storage 21, and a 3D image of the manikin patient body 100 showing the appearance of the patient selected on the superimposed patient selection display C2 may be aligned with and superimposed on the image of the manikin patient body 100 included in the 3D view image S. This structure increases the reality of the practice.

In the above example, the treatment instrument 80 to be used is selected by selecting one item on the treatment instrument selection display C71 in the superimposed treatment instrument selection display C7. In another example, the treatment instrument 80 to be used may be picked out of the treatment instruments 80 placed in the holder. This eliminates the selection on the superimposed treatment instrument selection display C7. Picking up the treatment instrument 80 may be detected as the operation of selecting the treatment instrument 80 to be used.

In the above example, the simulated root canal treatment and the simulated implant treatment are described. The treatments are not limited to the above procedures, and may include any other dental treatment procedures, such as gum disease treatment, tooth decay treatment, abutment tooth formation, scaling, and flap surgery. The treatments may also include preventive dental procedures in addition to dental treatments.

In the above example, the trainee P wears the HMD 60, and the 3D position of the HMD 60 is detected by the position detector 70 detecting the infrared marker 65 on the HMD 60. In another example, the HUD 60a shown in FIG. 7B may be used in place of the HMD 60 as described above.

The HUD 60a, which has the appearance of an eyeglass, includes stereo cameras 61a, a see-through display unit 62a, and a fixing band 64. The eyeglass part includes the see-through display unit 62a. The user visually recognizes the actual target site through the see-through display unit 62a while also visually recognizing the superimposed image appearing on the see-through display unit 62a.

Figure 7B:
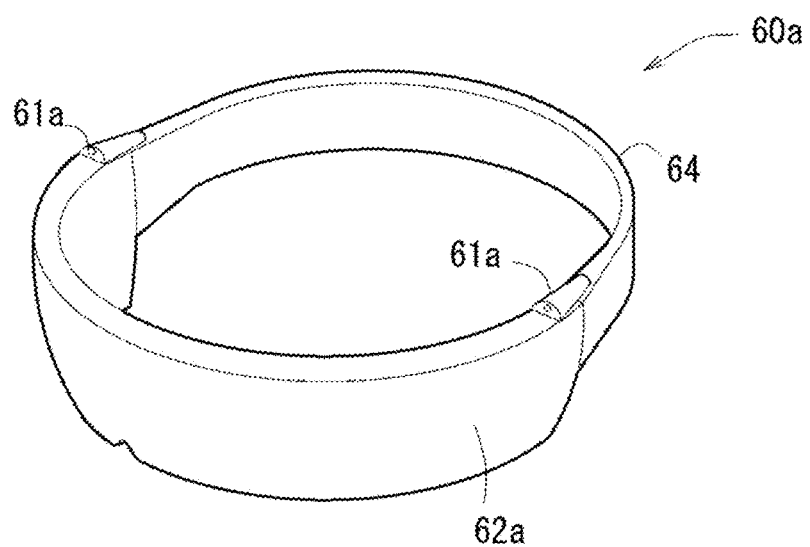

In FIG. 7B, although the infrared marker 65 for the HUD 60a is not shown, the HUD 60a may include the infrared marker 65 to have its 3D position detected by the position detector 70. In another example, an image recognition position detector that detects a 3D position by image recognition may also be used. The fixing band 64 may be eliminated, and the temples of the eyeglasses may be used to fix the device to the head.

REFERENCE SIGNS LIST 1 dental treatment training system
2 dental treatment training apparatus
10 control unit
62 display unit
62a see-through display unit
80 treatment instrument
91 cutting drill
92 file
93 drill burr
101 oral cavity
103 tooth model
C superimposed selection operation display
C2 superimposed patient selection display
C3 superimposed patient information selection display
C6 superimposed treatment selection display
C7 superimposed treatment instrument selection display
Cp center point
D root canal cutting state image display
M indicator display

The invention claimed is:

1. A dental treatment training apparatus for providing a simulated treatment in which a treatment instrument is applied onto a dental model, the apparatus comprising:
 a display unit configured to display, in a superimposed manner in a field of view of a trainee, image information based on predefined 3D information about the dental model and the treatment instrument;
 a 3D position detector configured to detect 3D positional information about the dental model, the treatment instrument, and the display unit;
 a selection unit configured to receive selection of an item associated with the simulated treatment; and
 a display control unit configured to cause the display unit to display, in a superimposed manner, image information about at least an invisible portion of the dental model and the treatment instrument corresponding to the item selected with the selection unit based on the 3D positional information detected by the 3D position detector,
 wherein:
 the selection unit includes an instrument selection unit for selecting the medical instrument to be used is provided;
 the display control unit causes the display unit to display, in a superimposed manner, an application state of the treatment instrument onto the dental model during the simulated treatment;
 the treatment instrument is a cutting instrument to cut the dental model, and
 the display unit displays, in a superimposed manner, a state indication image indicating the application state of the treatment instrument to indicate a relative position of a tip of the cutting instrument relative to a preset cutting end point in the dental model to be cut with the cutting instrument; and
 the state indication image is a circular indicator in which reference lines in a first direction and a second direction when a center of a hole provided in the dental model is viewed from a vertical direction are provided in a cross shape and centered at an intersection point of the cross shape which is the center of the hole, the circular indicator includes a cutting instrument point indicating a planar position near a proximal end of the cutting instrument, displaying a tip of the cutting instrument concentrically disposed with the circular indicator and a circular tip position indicating ring indicative of a residual distance in a depth direction from the tip of the hole.

2. The dental treatment training apparatus according to claim 1, wherein
 the predefined 3D information about the dental model includes 3D information about an inside of the dental model.

3. The dental treatment training apparatus according to claim 1, wherein
 the selection unit includes
 a treatment selection unit configured to receive selection of a simulated treatment to be performed, and
 the display control unit displays, in a superimposed manner, predefined 3D information about the dental model corresponding to the simulated treatment selected with the treatment selection unit and predefined 3D information about the treatment instrument selected with the instrument selection unit.

4. The dental treatment training apparatus according to claim 1, wherein
 the selection unit includes
 a patient selection unit configured to receive selection of an item from a plurality of simulated patient information items each including preset treatment information items about a simulated patient, and
 a preset treatment information selection unit configured to receive selection of a preset treatment information item associated with the simulated treatment from the preset treatment information items included in the simulated patient information item selected with the patient selection unit, and
 the display control unit displays, in a superimposed manner, the preset treatment information item selected with the preset treatment information selection unit.

5. A dental treatment training system, comprising:
 the dental treatment training apparatus according to claim 1; and
 a manikin patient body including at least a head having an oral cavity in which the dental model is mounted in a replaceable manner.

* * * * *